United States Patent
Namba et al.

(10) Patent No.: US 7,892,340 B2
(45) Date of Patent: Feb. 22, 2011

(54) INK-JET RECORDING INK, INK-JET RECORDING INK SET, INK-JET RECORDING INK MEDIA SET, INK CARTRIDGE, INK-JET RECORDING METHOD AND INK-JET RECORDING APPARATUS

(75) Inventors: Michihiko Namba, Yokohama (JP); Naoya Morohoshi, Numazu (JP); Tohru Ohshima, Atsugi (JP); Akihiko Gotoh, Atsugi (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/671,486

(22) PCT Filed: Nov. 20, 2008

(86) PCT No.: PCT/JP2008/071594
§ 371 (c)(1),
(2), (4) Date: Jan. 29, 2010

(87) PCT Pub. No.: WO2009/069721
PCT Pub. Date: Jun. 4, 2009

(65) Prior Publication Data
US 2010/0227067 A1    Sep. 9, 2010

(30) Foreign Application Priority Data
Nov. 26, 2007    (JP) .................... 2007-304372

(51) Int. Cl.
*C09D 11/02* (2006.01)
*C08L 85/00* (2006.01)
*B05D 5/00* (2006.01)
*B41J 2/01* (2006.01)

(52) U.S. Cl. ............ 106/31.89; 106/31.86; 106/31.78; 523/160; 523/161; 524/610; 524/612; 427/288; 347/100

(58) Field of Classification Search ............ 106/31.89, 106/31.86, 31.78; 523/160, 161; 524/610, 524/612; 347/100; 427/288
See application file for complete search history.

(56) References Cited

U.S. PATENT DOCUMENTS 6,051,057 A * 4/2000 Yatake et al. ............ 106/31.86

(Continued)

FOREIGN PATENT DOCUMENTS

JP    57-90070    6/1982

(Continued)

*Primary Examiner*—Helene Klemanski
(74) *Attorney, Agent, or Firm*—Cooper & Dunham LLP

(57) ABSTRACT

An ink-jet recording ink including water, a water-soluble organic solvent, a pigment (P1) as a colorant (B), and at least one fluorochemical surfactant selected from compounds represented by Structural Formula (1) below, Structural Formula (1)

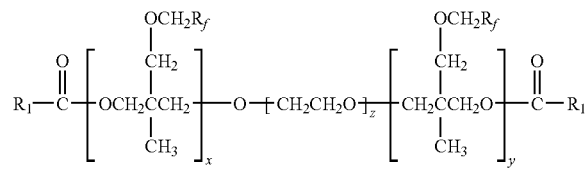

where $R_1$ denotes any one of a hydrogen atom, an alkyl group and a fluorine-containing group, Rf denotes a fluorine-containing group, and each of x, y and z denotes an integer of 1 or greater.

5 Claims, 6 Drawing Sheets

U.S. PATENT DOCUMENTS

| | | | |
|---|---|---|---|
| 6,187,086 B1 * | 2/2001 | Rehman | 106/31.86 |
| 6,187,419 B1 * | 2/2001 | Kijimuta et al. | 428/32.25 |
| 6,630,017 B2 * | 10/2003 | Ma et al. | 106/31.89 |
| 6,827,767 B2 * | 12/2004 | Miyamoto et al. | 106/31.89 |
| 7,094,813 B2 | 8/2006 | Namba et al. | |
| 7,284,851 B2 | 10/2007 | Bannai et al. | |
| 7,416,595 B2 * | 8/2008 | Ohkubo et al. | 106/31.78 |
| 7,645,036 B2 * | 1/2010 | Umebayashi et al. | 347/100 |
| 7,655,287 B2 * | 2/2010 | Yoshida et al. | 428/32.28 |
| 7,658,485 B2 * | 2/2010 | Ishibashi et al. | 347/89 |
| 7,699,457 B2 * | 4/2010 | Namba et al. | 347/100 |
| 2007/0088101 A1 * | 4/2007 | Iu et al. | 523/160 |
| 2007/0115325 A1 * | 5/2007 | Tsubaki | 347/52 |
| 2007/0120928 A1 * | 5/2007 | Ma et al. | 347/100 |
| 2007/0221078 A1 | 9/2007 | Namba et al. | |
| 2008/0070008 A1 | 3/2008 | Namba et al. | |
| 2008/0248260 A1 | 10/2008 | Kojima et al. | |
| 2009/0041940 A1 * | 2/2009 | Yokohama et al. | 427/256 |
| 2009/0162569 A1 * | 6/2009 | Morohoshi et al. | 427/561 |
| 2009/0186162 A1 * | 7/2009 | Namba et al. | 347/100 |
| 2009/0239044 A1 | 9/2009 | Habashi et al. | |
| 2009/0263632 A1 * | 10/2009 | Kojima et al. | 347/100 |
| 2010/0112219 A1 * | 5/2010 | Yokohama et al. | 427/256 |

FOREIGN PATENT DOCUMENTS

| | | |
|---|---|---|
| JP | 4-211478 | 8/1992 |
| JP | 5-263029 | 10/1993 |
| JP | 6-200200 | 7/1994 |
| JP | 10-140064 | 5/1998 |
| JP | 11-78225 | 3/1999 |
| JP | 2000-17207 | 1/2000 |
| JP | 2000-191972 | 7/2000 |
| JP | 2000-239590 | 9/2000 |
| JP | 2002-67473 | 3/2002 |
| JP | 2002-69346 | 3/2002 |
| JP | 2003-25717 | 1/2003 |
| JP | 2003-211819 | 7/2003 |
| JP | 2005-212327 | 8/2005 |
| JP | 2005-336496 | 12/2005 |
| JP | 2006-315363 | 11/2006 |
| JP | 2006-316243 | 11/2006 |
| JP | 2007-106110 | 4/2007 |
| JP | 2007-146135 | 6/2007 |
| JP | 2007-162017 | 6/2007 |
| JP | 2007-168161 | 7/2007 |
| JP | 2007-231206 | 9/2007 |
| JP | 2007-238813 | 9/2007 |
| JP | 2007-253616 | 10/2007 |
| JP | 2008-69327 | 3/2008 |
| JP | 2008-101192 | 5/2008 |

* cited by examiner

INK-JET RECORDING INK, INK-JET RECORDING INK SET, INK-JET RECORDING INK MEDIA SET, INK CARTRIDGE, INK-JET RECORDING METHOD AND INK-JET RECORDING APPARATUS

TECHNICAL FIELD

The present invention relates to an ink-jet recording ink, an ink-jet recording ink set, an ink-jet recording ink media set, an ink cartridge, an ink-jet recording method and an ink-jet recording apparatus which are superior in increasing image density, improving color development and reducing color bleeding on plain paper, and which are capable of recording high-quality images that are comparable with those produced by commercial printing such as offset printing, when the ink-jet recording ink of the present invention is combined with a specific recording medium.

BACKGROUND ART

Ink-jet recording is known as a superior recording method that is not much affected by the types of recorded materials. Recording apparatuses, recording methods, recording materials and the like based upon ink-jet recording have been actively studied and developed. Hitherto, inks containing aqueous dyes composed mainly of water have been most commonly used for ink-jet recording inks. The inks are still most commonly used in present-day ink-jet recording because they have many such advantages as follows: coloring materials high in absorption coefficient and also high in color purity can be easily obtained to prepare them, the inks can be easily made multicolored so as to widen color exhibiting ranges, the inks' long-term storage stability and the inks' stability against heat can be secured, and most notably inks capable of reducing the occurrence of kogation can be produced.

However, since the dye inks are disadvantageous in terms of weatherability and water resistance, studies on pigment inks that contain pigments instead of aqueous dyes have been remarkable in recent years, and pigment inks are put on the market these days. Unfortunately though, pigment inks still remain more problematic than dye inks in color-developing ability and stability; and along with the improvements in techniques for increasing image quality, particularly in relation to printers for office automation, pigment inks have been required to exhibit printing quality, hues, color saturation, glossiness, storage stability and the like on plain paper that are comparable with those exhibited by dye inks.

Additionally, in general, magenta inks and cyan inks used particularly as pigment inks contain C. I. Pigment Red 122 and C. I. Pigment Blue 15:3 respectively, and thus pigment inks have color reproducing ranges that are different from those of dye inks. Also, in order to reduce hue errors, toning is often carried out, in which case the color saturation inevitably decreases, thereby causing a problem with printing quality.

Meanwhile, in order to change hues without depending upon toning, pigments themselves are improved as well. For instance, Patent Literature 1 proposes a cyan pigment having a hue in the same color gamut as that of a cyan dye, by employing a phthalocyanine pigment with a specific crystal structure; however, not all requirements are satisfied, as there are problems concerning costs, etc.

There are many other proposals including the proposal of Patent Literature 2, which discloses an ink set wherein a pigment is used for a coloring material for a black ink, whereas dyes are used for coloring materials for yellow, magenta and cyan inks. However, pigment-containing inks which have satisfactory printing properties on plain paper have not yet been obtained in reality.

Additionally, as an ink set including a black ink and color inks, Patent Literature 3 discloses an ink set including a black ink that contains a self-dispersible carbon black as a coloring material, and color inks that contain coloring materials, wherein the coloring material for the black ink and the coloring materials for the color inks have opposite polarities. Further, Patent Literature 4 discloses an ink set including inks in which colorant-containing resins are dispersed, wherein the inks have different ionicities. However, as to printed matter produced using these ink sets, although bleeding on boundaries between colors can be reduced, other printing properties on plain paper still remain unsatisfactory.

Meanwhile, as a low surface-tension aqueous pigment ink with stable ejection properties and improved wettability, for instance, Patent Literature 5 proposes an ink-jet printing ink containing a water-soluble organic solvent, a colorant, water and a perfluoroalkyl sulfonate. Additionally, as described in Patent Literature 6 to Patent Literature 8, there are some proposals of ink compositions for which fluorochemical surfactants are used. However, all these proposals present such a problem that in the case where pigments are used for colorants, the colorants are inferior in dispersion stability, fixation on recording media and color-developing ability. Also, in general, low surface-tension aqueous inks with improved wettability (including the inks of Patent Literature 5 to Patent Literature 8) present such a drawback that fluorochemical surfactants used in the inks cause the inks to foam greatly, and thus there are very serious effects on the ink feeding capability and the ejection stability of nozzles.

As for media, conventional ink-jet paper, particularly ink-jet glossy media, can be classified into swellable media and void-type media; these days, void-type media, which are superior in ink drying rate, are more popular. As these void-type media, media each incorporating an ink-absorbing layer that has voids through which ink is to be supplied onto a substrate, and also incorporating, if necessary, a porous glossy layer are most commonly used. As disclosed in Patent Literature 9 and Patent Literature 10, each of such void-type media can be obtained as follows: a coating solution in which silica or an alumina hydrate is dispersed is applied onto a substrate in one or more layers; and, if necessary, a glossy layer containing a large amount of colloidal silica is applied over the layer(s). Paper of this type is designed, with importance being placed on its compatibility with dye inks that are most commonly used at present, and the paper is already widely used as ink-jet paper, particularly as glossy paper. Use of the paper makes it possible to obtain very high definition output with high glossiness; on the other hand, since materials for the paper are very expensive and processes of producing the paper are complicated, the production costs of the paper are far higher than those of ordinary glossy coated paper for commercial printing. Thus, the use of the paper tends to be limited to cases where high-definition output such as photographic output is needed; and in reality the paper is difficult to use in the field of commercial printing where a great deal of output is required at low costs, for example in the production of handbills, catalogues, pamphlets, etc. These days, for the sake of higher image quality, the number of colors of inks used in printing tends to be increased, and the required ink absorbability tends to be increased as well. To increase the ink absorbability of media, it is reasonable to increase the thickness of ink receiving layers (coat layers); however, the thicker they are, the more expensive the materials therefor are, which leads to a rise in the unit prices of the media.

For pigments that form the ink-absorbing layers (receiving layers), it is necessary to use materials which are small in refractive index and have low concealing properties, in other words which are capable of keeping the transparency of the layers high and which absorb large amounts of oil (have large specific surface areas). Thus, in reality, there is no choice but to use large amounts of expensive low refractive-index, high oil-absorbing pigments such as silica or alumina hydrates, as opposed to inexpensive white pigments such as calcium carbonate and kaolin. Specifically, this is because if pigments having low transparency and high concealing properties are used for the ink-absorbing layers, coloring materials in inks that have soaked into the ink-absorbing layers are concealed by these pigments having high concealing properties, thereby causing a reduction in density. In fact, when paper which contains a pigment having high concealing properties is subjected to ink-jet printing with a dye ink, density is derived only from a coloring material present in the vicinity of a surface layer of the paper, no matter how increased the amount of ink to be applied is; thus, the density is low as a whole, and an image with little contrast is produced. Meanwhile, when a material which absorbs only a small amount of oil is used, ink absorption is insufficient, and thus beading easily arises.

Accordingly, these days, attempts to achieve a favorable balance between the refractive index and the whiteness are made by using fine organic particles having a small refractive index, as disclosed in Patent Literature 11; however, the fine organic particles, too, are high in production cost, and so it is still difficult to obtain inexpensive ink receiving paper which is compatible with dye inks.

As for the design concept for long-term storage stability of images produced, since dye molecules themselves are not highly resistant to ultraviolet rays or ozone, such a method is most commonly employed that a dye is made to soak into an ink receiving layer of a medium as deeply as possible so as to minimize the effects of the air and ultraviolet rays, and the dye is protected with an antioxidant or stabilizer previously added into an image receiving layer of the medium. Accordingly, by using a large amount of ink in which the concentration of a coloring material is relatively low, deep penetration of the ink is secured (ensured) and image storage stability is maintained. Consequently, the amount of ink necessary to output images thereby increases, which not only makes it difficult to miniaturize cartridges but also raises printing costs.

Judging from the above-mentioned points, in ink-jet recording, it is very difficult to provide inexpensive ink-jet paper and a printing method which are capable of high-definition output.

Meanwhile, in recent years, note has been taken of pigment inks for ink-jet recording. Since pigments are insoluble in water, pigment inks in which pigments are formed as fine particles and dispersed in solvents are generally used. As pigment inks for ink-jet recording, however, pigment inks in which pigments are dispersed in water are most commonly used in view of safety, etc. Generally, aqueous pigment inks easily cause flocculation or precipitation of pigment particles in comparison with dye inks; in order for the long-term storage stability of the aqueous pigment inks to be comparable with that of dye inks, various dispersion conditions and additives are necessary; also, dispersion stabilizers cause kogation; thus, the aqueous pigment inks are difficult to use with thermal heads, and also there is such a drawback that many of them contain coloring materials which are narrower in color exhibiting range than dyes. Nevertheless, the aqueous pigment inks have been attracting more and more attention for their printing quality, such as their capability of obtaining high black density, and for their storage stability and water resistance after recording. Ink-jet printers using the pigment inks are deemed able to approximate the texture of printed matter to that of printed matter produced by commercial printing because the coloring materials contained in the pigment inks are similar to those contained in ordinary commercial printing inks; however, when coated paper for commercial printing is actually printed with images or the like using conventional pigment inks, the pigment inks do not dry as quickly as they should, and thus the images or the like bleed, or pigments are not fixed at all after dried, for example; consequently, as in related art, the ink-jet printers are only suitable for printing onto media which have high ink-absorbing properties, such as plain paper and ink-jet paper. This is because the design concept concerning the formation of ink-jet images is no different from the concept in the case where dye inks are used; specifically, the pigments as coloring materials are merely viewed as dyes having high light resistance, and characteristics of the pigment inks are not considered at all.

Patent Literature 12 and Patent Literature 13 each disclose an image recording method employing an ink-jet recording method in which pigment inks are applied onto inexpensive general-purpose paper for commercial printing, not ink-jet paper. However the image recording method presents the following problems: the inks are attached in large amounts to the inexpensive general-purpose paper for commercial printing, which necessitates spending a great deal of time in drying the inks; moreover, in this state where the inks are excessively attached to the printing paper surface, the inks having different colors become adjacent to one another before being absorbed into the printing paper, and thus bleeding between the different colors easily arises.

Patent Literature 14 discloses a method in which in order to produce a color proof using an ink-jet printer, a precoating solution having a function of flocculating a pigment is attached onto a recording medium before printing is performed by the ink-jet printer. However, this method is problematic in that the process of attaching the precoating solution makes operation complicated, and also in that when the precoating solution is attached onto the recording medium, the amount of water attached per unit area of the recording medium is large, which easily causes troubles in conveying the recording medium, such as curling and cockling.

[Patent Literature 1] Japanese Patent Application Laid-Open (JP-A) No. 2000-17207
  [Patent Literature 2] JP-A No. 2000-239590
  [Patent Literature 3] JP-A No. 10-140064
  [Patent Literature 4] JP-A No. 2000-191972
  [Patent Literature 5] JP-A No. 57-90070
  [Patent Literature 6] JP-A No. 04-211478
  [Patent Literature 7] JP-A No. 05-263029
  [Patent Literature 8] JP-A No. 06-200200
  [Patent Literature 9] JP-A No. 2005-212327
  [Patent Literature 10] JP-A No. 11-078225
  [Patent Literature 11] JP-A No. 2003-025717
  [Patent Literature 12] JP-A No. 2002-67473
  [Patent Literature 13] JP-A No. 2002-69346
  [Patent Literature 14] JP-A No. 2003-211819

DISCLOSURE OF INVENTION

In light of the above-mentioned practical situations, the present invention is designed to achieve the following aim.

Specifically, an object of the present invention is to provide an ink-jet recording ink, an ink-jet recording ink set, an ink-jet recording ink media set, an ink cartridge, an ink-jet recording method and an ink-jet recording apparatus, wherein a combination of a fluorochemical surfactant having a specific structure and a pigment (P1) serving as a colorant (B) on plain paper makes it possible to increase image density, improve color development and reduce color bleeding on the plain paper; a combination of the ink-jet pigment ink and an ink-jet recording medium shown in the present invention makes it possible to obtain printed matter which is inexpensive, excellent in quality, superior in density, glossiness and image reliability and comparable with commercial printed matter; and it is possible to secure superior reliability in terms of ejection stability, storage stability and the like.

The above-mentioned aim can be achieved by the present invention explained below.

<1> An ink-jet recording ink including water, a water-soluble to organic solvent, a pigment (P1) as a colorant (B), and at least one fluorochemical surfactant selected from compounds represented by Structural Formula (1) below,

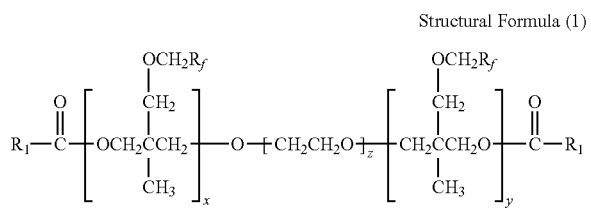

Structural Formula (1)

where $R_1$ denotes any one of a hydrogen atom, an alkyl group and a fluorine-containing group, Rf denotes a fluorine-containing group, and each of x, y and z denotes an integer of 1 or greater.

<2> The ink-jet recording ink according to <1>, further including a water-dispersible resin (A), wherein the water-soluble organic solvent is at least one selected from the group consisting of glycerin, trimethylolpropane, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, 1,6-hexanediol, 2-methyl-2,4-hexanediol, 2-pyrrolidone, N-methyl-2-pyrrolidone, N-hydroxyethyl-2-pyrrolidone, tetramethylurea and urea.

<3> The ink-jet recording ink according to <2>, wherein the water-dispersible resin (A) contains at least one of an anionic self-emulsifiable ether-based polyurethane resin emulsion and an acrylic-silicone resin emulsion.

<4> An ink-jet recording ink including water, a water-soluble organic solvent, a water-dispersible resin (A), a pigment as a colorant (B), and at least one fluorochemical surfactant selected from compounds represented by Structural Formula (1) below, wherein the ink-jet recording ink has a surface tension of 20 mN/m to 35 mN/m at 25° C. and a viscosity of 5 mPa·s or greater at 25° C., wherein the total amount of the water-dispersible resin (A) and the colorant (B) present in the ink-jet recording ink is 5% by mass to 40% by mass, and a mass ratio (A)/(B) of the water-dispersible resin (A) to the colorant (B) is in the range of 0.5 to 4, and wherein the ink-jet recording ink is used for ink-jet recording on an ink-jet recording medium for pigment ink, which includes a support containing cellulose pulp, and one or more pigment penetration preventing layers on one or both surfaces of the support, with the one or more pigment penetration preventing layers containing 30% by mass or more of an inorganic pigment (P2) that is different from an alumina hydrate and that has a refractive index of 1.5 or greater, and containing 10% by mass or less of an inorganic pigment (P2) that has a refractive index of less than 1.5,

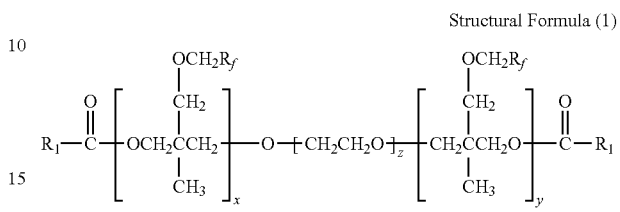

Structural Formula (1)

where $R_1$ denotes any one of a hydrogen atom, an alkyl group and a fluorine-containing group, Rf denotes a fluorine-containing group, and each of x, y and z denotes an integer of 1 or greater.

<5> An ink-jet recording ink media set including the ink-jet recording ink according to any one of <2> to <4>, and an ink-jet recording medium for pigment ink, which includes a support containing cellulose pulp, and one or more pigment penetration preventing layers on one or both surfaces of the support, with the one or more pigment penetration preventing layers containing 30% by mass or more of an inorganic pigment (P2) that is different from an alumina hydrate and that has a refractive index of 1.5 or greater, and containing 10% by mass or less of an inorganic pigment (P2) that has a refractive index of less than 1.5.

<6> An ink-jet recording ink set including a black ink, and color inks, wherein each of the black ink and the color inks is the ink-jet recording ink according to any one of <1> to <4>.

<7> The ink-jet recording ink according to <4>, wherein the one or more pigment penetration preventing layers have a thickness of 10 μm or less.

<8> An ink cartridge including a container to house the ink-jet recording ink according to any one of <1> to <6>.

<9> An ink-jet recording method including performing recording with the use of a combination of an ink-jet recording ink and a recording medium, wherein the ink-jet recording ink is the ink-jet recording ink according to any one of <1> to <4>, wherein the recording medium is an ink-jet recording medium for pigment ink, which includes a support containing cellulose pulp, and one or more pigment penetration preventing layers on one or both surfaces of the support, with the one or more pigment penetration preventing layers containing 30% by mass or more of an inorganic pigment (P2) that is different from an alumina hydrate and that has a refractive index of 1.5 or greater, and containing 10% by mass or less of an inorganic pigment (P2) that has a refractive index of less than 1.5, and wherein the amount of the ink-jet recording ink attached onto the recording medium is 15 g/m² or less.

<10> The ink-jet recording method according to <9>, further including jetting the ink-jet recording ink so as to form an image on the recording medium, by applying a stimulus to the ink-jet recording ink.

<11> The ink-jet recording method according to <10>, wherein the stimulus is at least one selected from heat, pressure, vibration and light.

<12> An ink-jet recording apparatus including an ink jetting unit configured to jet the ink-jet recording ink according to any one of <2> to <4> toward an ink-jet recording medium for pigment ink and perform printing such that the amount of the ink-jet recording ink attached onto the recording medium is 15 g/m$^2$ or less, wherein an ink cartridge and the ink-jet recording medium are installed in the ink-jet recording apparatus, wherein the ink cartridge includes a container to house the ink-jet recording ink, and wherein the ink-jet recording medium includes a support containing cellulose pulp, and one or more pigment penetration preventing layers on one or both surfaces of the support, with the one or more pigment penetration preventing layers containing 30% by mass or more of an inorganic pigment (P2) that is different from an alumina hydrate and that has a refractive index of 1.5 or greater, and containing 10% by mass or less of an inorganic pigment (P2) that has a refractive index of less than 1.5.

<13> An ink-jet recording apparatus including a recording head, and a unit configured to reverse paper and thereby enable double-sided printing, wherein the ink-jet recording ink according to any one of <1> to <4> is ejected as droplets from the recording head so as to record an image on the paper.

According to the present invention, problems in related art can be solved, and the following can be provided: an ink-jet recording ink, an ink-jet recording ink set, an ink-jet recording ink media set, an ink cartridge, an ink-jet recording method and an ink-jet recording apparatus, wherein a combination of a fluorochemical surfactant having a specific structure and a pigment (P1) serving as a colorant (B) on plain paper makes it possible to increase image density, improve color development and reduce color bleeding on the plain paper; a combination of the ink-jet pigment ink and an ink-jet recording medium shown in the present invention makes it possible to obtain printed matter which is inexpensive, excellent in quality, superior in density, glossiness and image reliability and comparable with commercial printed matter; and it is possible to reduce beading and secure superior reliability in terms of ejection stability, storage stability and the like.

BEST MODE FOR CARRYING OUT THE INVENTION

Figure 1:
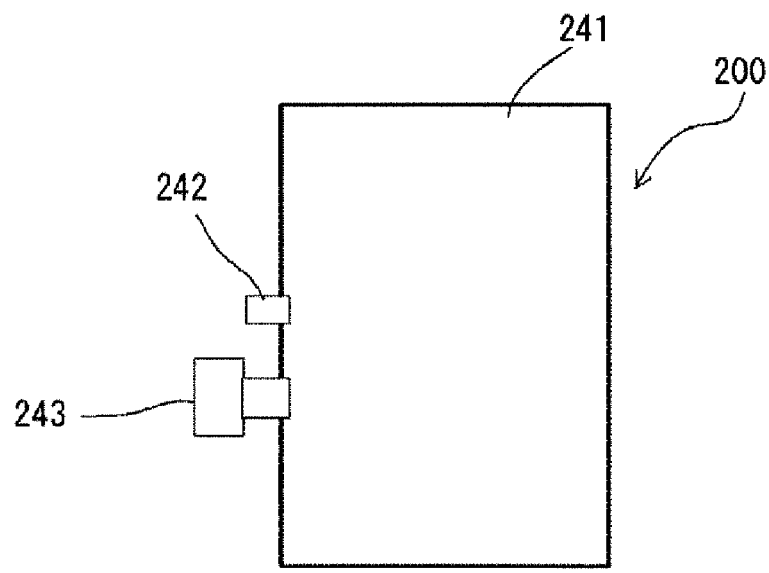
FIG. 1 is a schematic diagram showing one example of an ink cartridge of the present invention.

The following explains in detail an ink-jet recording ink, an ink-jet recording ink set, an ink-jet recording ink media set, an ink cartridge, an ink-jet recording method and an ink-jet recording apparatus of the present invention.

As a result of carrying out a series of earnest examinations to achieve the aim of increasing image density, improving color development and reducing color bleeding on plain paper, the present inventors have found that since an ink-jet recording ink of the present invention includes a pigment (P1) as a colorant (B) and is combined with a fluorochemical surfactant having a specific structure, the ink-jet recording ink has head ejection stability and is excellent in increasing image density, improving color development and reducing color bleeding on plain paper. As to the foregoing, it is inferred that when included in the ink, the fluorochemical surfactant for use in the present invention gives the ink great wettability, makes ink components other than the colorant quickly penetrate into the plain paper after ink droplets have come into contact with the plain paper, and makes the colorant remain on the paper surface, thereby yielding an increase in image density; also, it is inferred that since the ink's great wettability produces a strong effect of making the colorant remain uniformly on the plain paper, the uniformity of a solid image portion or the like improves, thereby yielding an improvement in color development. Additionally, it is inferred that the uniform penetration of the ink components other than the colorant into the plain paper promotes uniform fixation of the colorant and reduces bleeding between colors. Further, it has been found that this fluorochemical surfactant is, due to its structure, superior in leveling ability at the gas-liquid interface, very effective in preventing foaming of the ink, and superior in supplying the ink to a head, and has a great effect on ejection stability in high-speed printing, etc.

As to fluorochemical surfactants in general, there has been concern over their safety and effects on the environment (e.g. accumulation of PFOS or PFOA in the human body) in recent years, and the effects are viewed as an environmental problem. However, the fluorochemical surfactant used in the present invention is accepted by United States Environmental Protection Agency (EPA) as safe for the environment, and so the fluorochemical surfactant can be suitably used in terms of safety as well. The amount of at least one fluorochemical surfactant selected from compounds represented by Structural Formula (1) above, in the ink-jet recording ink is preferably 0.01% by mass to 10% by mass, more preferably 0.1% by mass to 5% by mass. When the amount is less than 0.01% by mass, there is no remarkable effect on improvement in color development in terms of image quality. When the amount is greater than 10% by mass, there is an adverse effect on dispersion of the pigment serving as a colorant in the ink, which lowers dispersion stability and causes thickening of the ink and flocculation of particles, and thus there is an adverse effect on the storage stability of the ink.

(Recording Media)

Next, recording media will be explained.

Generally, ink-jet coated paper (an ink-jet medium) for realizing a high-quality image is designed such that an ink receiving layer (coat layer) formed of an inorganic pigment is present on or near a base surface, and an image is formed as the ink receiving layer itself absorbs ink (or ink penetrates into the ink receiving layer). This is deeply related to the fact that ink-jet recording technologies have been developed based upon dye inks.

In essence, dyes are color-developing substances that are supposed to penetrate into substances with affinity and to bond with them (covalent bond, ionic bond or van der Waals bond), whereas pigments have no (or little) bonding force and need to be bonded by adhesives (binders). Therefore, in the case of ink-jet recording using dye ink, ink receiving layer material is, in effect, dyed, and this fact has prompted technological concepts, for example an idea of dyeing an ink receiving layer as uniformly as possible or dyeing ink receiving layer material as much as possible using ink-jet ink; in order to obtain high-density, high-quality images, techniques for soaking ink-jet ink deeper into ink receiving layers, techniques for combining ink-jet ink and ink receiving layer material as firmly as possible, and techniques for achieving a favorable balance between ink absorbability and color-developing ability have been developed.

As described above, the most common method for producing present-day ink-jet paper includes forming an ink-absorbing layer which is porous and highly transparent; to realize this method, it is necessary to primarily use a material having a low refractive index and a large specific surface area, and in reality the ink-jet paper inevitably depends upon an expensive material such as silica or an alumina hydrate and an elaborate production method. It goes without saying that printing costs are very high, and application of the ink-jet paper to mass printing, etc. is difficult.

As a result of carrying out earnest studies on a lower-cost ink-jet recording method in light of the foregoing, the present inventors have devised a low-cost image forming method based upon a novel design concept, realized by combining a highly penetrative pigment ink and a medium having low ink-absorbing properties, as opposed to a conventional medium.

Specifically, we have found that a favorable balance between sufficient image density and drying capability can be achieved with a small amount of ink in the following manner: by conducting printing onto a recording medium whose ink-absorbing properties (ink penetration properties) have been reduced so as to prevent a pigment (P1) as a coloring material in the ink from soaking into the recording medium as much as possible, using a small amount of extremely penetrative pigment ink, only a solvent (water and an organic solvent) that is a component of the ink is selectively soaked into a support, and only the coloring material (pigment (P1)) in the ink is made to remain efficiently on the medium surface.

The recording medium having reduced ink-absorbing properties in the present invention can be realized by providing (for example applying) a layer for preventing pigment penetration (barrier layer) on a support composed mainly of cellulose pulp, in other words on a paper substrate. By approximating the appearance of this barrier layer to that of printing paper, it is even possible to obtain printed matter which is similar in quality to ordinary commercial printed matter. It has been found that by limiting the pore size, diameter, thickness, etc. of the barrier layer, the ink penetration properties (barrier properties) can be reduced to a desired level.

In order to promote separation of the pigment (P1) and the ink solvent in the ink, the thickness of the barrier layer is preferably less than or equal to a predetermined thickness; specifically, the thickness of the barrier layer is preferably 10 μm or less, more preferably 5 μm or less. When the thickness is greater than 10 μm, penetration of the ink solvent takes a long time, beading, bleeding and the like easily arise, causing the image quality to lower, and degradation of drying capability easily causes offset and the like. Also, since it is necessary to make the barrier layer thin and therefore to prevent offset (a phenomenon in which the color of a coloring material printed on one side of paper can also be seen from the other side) of the coloring material, for example, an inorganic pigment (P2) having a high refractive index and high concealing properties needs to be contained in large amounts in the barrier layer, as opposed to a conventional ink-jet medium; specifically, it is necessary for the barrier layer to contain 30% by mass or more of the inorganic pigment (P2) having a refractive index of 1.5 or greater. Silica, a material that has a low refractive index and low concealing properties and that is used for conventional ink-jet media, may be contained in the barrier layer; however, if a highly transparent pigment (P2) is contained in large amounts in the barrier layer, offset intensifies and the cost increases; therefore, it is necessary for the amount of silica to be 10% by mass or less. Thus, by using a material having a high refractive index as a white pigment that forms the barrier layer, offset can be reduced even when the barrier layer is made thin, and the cost can be further lowered.

Additionally, some alumina hydrates can be used as pigments having high refractive indices; however, if a material which absorbs too much oil such as an alumina hydrate is contained in large amounts in the barrier layer, the ink solvent does not easily move from the barrier layer to the substrate. An alumina hydrate having absorbed a large amount of solvent is not desirable in the present invention because when stored for a long period of time, it induces discoloration and image bleeding related to migration of a pigment.

The function necessary for the barrier layer in the present invention is to separate the pigment (P1) and the solvent in the ink from each other and make only the solvent penetrate into the substrate. In order for that to take place, it is desirable that the barrier layer have small holes (pores). If the barrier layer has no pores whatsoever, penetration of solvent components of the ink takes place slowly, thereby easily causing a phenomenon in which the ink does not dry. Conversely, if pores are too large in diameter, or the number of pores is too large, the function of separating the pigment (P1) and the solvent in the ink from each other degrades, the image density decreases, and the pigment (P1) which is present on the medium surface after printing migrates into the medium with time, causing a change in color. Therefore, it is necessary for the pores to be 1 μm or less in diameter, and the pores preferably occupy 40% or less of the medium surface in area.

The pore diameter and the area of the pores with respect to the area of the medium surface can be measured through surface observation in accordance with SEM. The pore diameter and the area ratio can be calculated by binarizing an image of a pore portion base upon a photograph of the surface. In the present invention, the field-emission scanning electron microscopes JSM-7400F (manufactured by JEOL Ltd.) and FE-SEM S-4200 (manufactured by Hitachi, Ltd.) are used as SEMs, and POPIMAGING (ver. 3.51) (manufactured by Digital being kids Co., Ltd.) is used for image processing.

(Ink)

A pigment ink essential for the present invention is required to be extremely penetrative; at 25° C., the pigment ink has a surface tension of 20 mN/m to 35 mN/m, preferably 23 mN/m to 33 mN/m, more preferably 25 mN/m to 30 mN/m. Also, at 25° C., the pigment ink has a viscosity of 5 mPa·s or greater, preferably 5 mPa·s to 15 mPa·s, more preferably 5 mPa·s to 10 mPa·s. As for a surfactant used in the present invention, one or more fluorochemical surfactants each having a specific structure are contained in the ink. The total amount of a water-dispersible resin (A) and a colorant (B) present in the ink is preferably 5% by mass to 40% by mass, and the mass ratio (A)/(B) of the water-dispersible resin (A) to the colorant (B) is preferably in the range of 0.5 to 4, more preferably in the range of 1 to 2.5.

The following explains components of the ink essential for the present invention.

The recording ink of the present invention includes water, a water-soluble organic solvent, a pigment (P1) as a colorant (B), and a fluorochemical surfactant having a specific chemical structure, and further includes other components in accordance with the necessity.

For the fluorochemical surfactant having the specific chemical structure, at least one selected from compounds represented by Structural Formula (1) below is used.

Structural Formula (1)

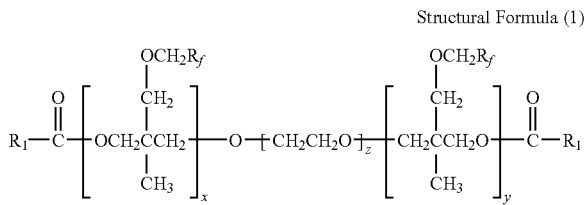

(In structural formula (1), $R_1$ denotes any one of a hydrogen atom, an alkyl group and a fluorine-containing group, Rf denotes a fluorine-containing group, and each of x, y and z denotes an integer of 1 or greater.)

In Structural Formula (1), Rf denotes a fluorine-containing group, particularly preferably a perfluoroalkyl group.

<Suitable Ranges for Structural Formula (1)>

$R_1$: alkyl group such as methyl group or ethyl group, perfluoroalkyl group

Rf: perfluoroalkyl group, with the number of carbon atoms being 2 or 4 in the carbon chain x, y: 1 to 4 z: 6 to 25

The following provides reasons why these ranges are suitable. As to $R_1$, an alkyl group having a short carbon chain or a fluorinated alkyl group having a short carbon chain is favorable in view of storage stability. As to Rf, a perfluoroalkyl group having four or fewer carbon atoms is favorable in view of safety against PFOS and PFOA, which are fluorine-based compounds, because accumulation of PFOS and PFOA in the human body can be prevented. As to x, y and z, when they exceed the upper limits of the ranges shown above, there is an adverse effect on storage stability; when they are less than the lower limits of the ranges shown above, the function of securing dispersion stability and antifoaming ability degrades.

The perfluoroalkyl group is preferably a perfluoroalkyl group having 1 to 10 carbon atoms, more preferably a perfluoroalkyl group having 1 to 4 carbon atoms in view of safety, and examples thereof include $-CF_3$, $-CF_2CF_3$, $-CF_2CF_2CF_3$ and $-CF_2CF_2CF_2CF_3$, with particular preference being given to $-CF_3$ and $-CF_2CF_3$. As to $R_1$ that denotes any one of a hydrogen atom, an alkyl group and a fluorine-containing group, examples of the alkyl group include methyl group, ethyl group, propyl group and butyl group, and examples of the fluorine-containing group include $-CF_3$, $-CF_2CF_3$, $-CF_2CF_2CF_3$ and $-CF_2CF_2CF_2CF_3$, with particular preference being given to $-CF_3$ and $-CF_2CF_3$ in terms of improvement in image quality. As to x, y and z, it is desirable that x and y be integers of 6 to 25 and z be an integer of 1 to 4, and it is more desirable that x and y be integers of 10 to 22 and z be an integer of 2 to 4 in terms of the dispersion stability of the pigment (P1) as a colorant and the storage stability of the ink.

Such a fluorochemical surfactant is different in structure from fluorochemical surfactants (each of which is a fluorochemical surfactant having ammonium base sulfonates or hydroxy groups at both terminals of a main chain) described in PCT/US2006/029862 and US2007/0088101 A; examples of such a fluorochemical surfactant include AT-1202 produced by OMNOVA Solutions Inc., which can be effectively used in the present invention.

Also as to the ink of the present invention, the mass ratio of the colorant (B) to the water-dispersible resin (A) is reduced and at least one type of fluorochemical surfactant having a specific structure is contained as a surfactant in the ink so as to improve the wettability and penetrability of the ink; uniformity of coloring material on paper is produced; and at least one selected from an anionic self-emulsifiable ether-based polyurethane resin emulsion and an acrylic-silicone resin emulsion is contained in the water-dispersible resin (A); thus, printed matter capable of being firmly fixed onto an inexpensive medium of the present invention and comparable with commercial printed matter can be achieved by a combination of the ink and the medium.

For the water-dispersible resin (A) able to be used in the present invention, at least one selected from a polyurethane resin emulsion and an acrylic-silicone resin emulsion, or a combination thereof is suitable. Also, the water-dispersible resin (A) is present as an O/W emulsion when used as a raw material in preparation of the ink or after the ink has been prepared.

When at least one selected from a polyurethane resin emulsion and an acrylic-silicone resin emulsion is used, the emulsion/emulsions is/are present in the ink by a total of 1% by mass to 40% by mass, preferably a total of 1% by mass to 20% by mass.

Polyurethane resin emulsions are classified into emulsions produced by emulsifying ordinary polyurethane resins that are relatively hydrophilic with the external use of emulsifiers, and self-emulsifiable emulsions in which functional groups serving as emulsifiers are introduced into resins themselves by copolymerization or the like. In terms of a combination of the water-dispersible resin (A) and the pigment (P1), etc. able to be used in the ink of the present invention, it is anionic self-emulsifiable polyurethane resin emulsions that are always superior in dispersion stability. In the case where an anionic self-emulsifiable polyurethane resin emulsion is used, it is desirable that the polyurethane resin be based upon an ether rather than a polyester or polycarbonate in terms of the fixation and dispersion stability of the pigment (P1). For some unknown reason, in many cases, polyurethane resins that are not based upon ethers have little resistance to solvent and thus easily cause flocculation of particles and a rise in ink viscosity when ink is stored at high temperatures.

The ether polyurethane resin emulsion has an average particle diameter of 300 nm or less, preferably 100 nm or less, more preferably 80 nm or less. In particular, by reducing its average particle diameter to 100 nm or less, it is possible to improve the reliability of an ink-jet printer, for example ink ejection stability after the ink-jet printer has been left unused for a long period of time.

The glass transition temperature of the ether polyurethane resin emulsion is preferably in the range of −50° C. to 150° C., more preferably in the range of −10° C. to 100° C. For some unknown reason, when the glass transition temperature is higher than 150° C., the ether polyurethane resin emulsion is hard like glass with respect to its film forming properties, but a printed portion, formed as particles of the pigment (P1) and the ether polyurethane resin emulsion simultaneously come into contact with an image support, has unexpectedly little abrasion resistance; when the glass transition temperature is 150° C. or lower, the ether polyurethane resin emulsion is soft like rubber with respect to its film forming properties, but a printed portion is superior in abrasion resistance. Meanwhile, when the glass transition temperature is lower than −50° C., the film is too soft and a printed portion is inferior in abrasion resistance. Thus, it has been found that when there is no difference in the amount of the ether polyurethane resin emulsion added, the range of −50° C. to 150° C. is suitable for its glass transition temperature in terms of the abrasion resistance of printed matter. Additionally, the glass transition temperature of the resin mentioned in the present invention can be measured in accordance with either DSC (differential scanning calorimetry) or TMA (thermo-mechanical analysis).

The minimum film forming temperature of the ether polyurethane resin emulsion is preferably lower than or equal to room temperature, more preferably lower than or equal to 25° C. When the ether polyurethane resin emulsion is formed into a film at a temperature which is lower than or equal to room temperature, particularly at a temperature which is lower than or equal to 25° C., it is favorable because binding of paper fiber automatically proceeds without the need to heat, dry, etc. an image support where an image has been formed.

Here, the "minimum film forming temperature (MFT)" is defined as the minimum temperature at which a continuous transparent film is formed, when aqueous emulsion particles obtained by dispersing ether polyurethane resin emulsion particles into water are thinly cast onto a metal plate made of aluminum or the like and the temperature is increased.

Next, acrylic-silicone resin emulsions able to be used in the present invention will be described.

The acrylic-silicone resin emulsion of the present invention is a silicone-modified acrylic resin emulsion which can be obtained by polymerizing an acrylic monomer and a silane compound in the presence of an emulsifier.

Examples of the acrylic monomer include acrylic acid ester monomers such as methyl acrylate, ethyl acrylate, butyl acrylate, 2-ethylhexyl acrylate, 2-hydroxyethyl acrylate, acryloyl morpholine and N,N'-dimethylaminoethyl acrylate; methacrylic acid ester monomers such as methyl methacrylate, ethyl methacrylate, butyl methacrylate, 2-ethylhexyl methacrylate, 2-hydroxyethyl methacrylate and N,N'-dimethylaminoethyl methacrylate; amide acrylates such as N-methylolacrylamide and methoxymethylacrylamide; and carboxylic acid-containing monomers such as maleic acid, fumaric acid, itaconic acid, acrylic acid and methacrylic acid.

Examples of the emulsifier of the present invention include alkylbenzenesulfonic acids and salts thereof, dialkylsulfosuccinic acid esters and salts thereof, alkylnaphthalenesulfonic acids and salts thereof, formalin condensates of alkylnaphthalene sulfonates, higher fatty acid salts, sulfonates of higher fatty acid esters, polyoxypropylene-polyoxyethylene condensates of ethylenediamine, sorbitan fatty acid esters and salts thereof, aromatic/aliphatic phosphoric acid esters and salts thereof, dodecylbenzene sulfonates, dodecyl sulfates, lauryl sulfates, dialkylsulfosuccinic acid salts, polyoxyethylene alkylphenyl ether sulfates, polyoxyethylene alkylpropenylphenyl ether sulfates, alkylphenyl ether disulfonates, polyoxyethylene alkyl phosphates, polyoxyethylene alkyl ether acetates, polyoxyethylene lanolin alcohol ethers, polyoxyethylene lanolin fatty acid esters, lauryl alcohol ethoxylates, lauryl ether sulfates, lauryl ether phosphoric acid esters, sorbitan fatty acid esters, fatty acid diethanol amides and formalin condensates of naphthalene sulfonic acid. Here, examples of the salts include sodium and ammonium.

Also, as the emulsifier of the present invention, a reactive emulsifier having an unsaturated double bond may be used as well. Examples of the reactive emulsifier include ADEKA REASOAP SE, NE and PP (produced by Asahi Denka Co., Ltd.), LATEMUL S-180 (produced by Kao Corporation), ELEMINOL JS-2 and RS-30 (produced by Sanyo Chemical Industries, Ltd.) and AQUALON RN-20 (produced by Dai-Ichi Kogyo Seiyaku Co., Ltd.).

Examples of the silane compound include tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltrimethoxysilane, hexyltrimethoxysilane, decyltrimethoxysilane and trifluoropropyltrimethoxysilane.

Also, monomers generally known as silane coupling agents may be used as well, and examples thereof include vinyltrichlorsilane, vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, hydrochlorides of N-(vinylbenzyl)-2-aminoethyl-3-aminopropyltri ethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide and 3-isocyanatepropyltriethoxysilane.

In the present invention, the term "hydrolyzable silyl group" denotes a silyl group which contains a hydrolyzable group, and examples of the hydrolyzable group include alkoxy groups, mercapto groups, halogen groups, amide groups, acetoxy group, amino groups and isopropenoxy group.

A silyl group hydrolyzes into a silanol group, and the silanol group dehydrates and condenses to yield a siloxane bond. In the silicone-modified acrylic resin used for the ink of the present invention, it is desirable that the hydrolyzable silyl group hydrolyze as a result of polymerization reaction and finally disappear. If the hydrolyzable silyl group remains, it is not favorable because of degradation of the storage stability of the ink that has been prepared.

Fine particles of the silicone-modified acrylic resin preferably have an average diameter of 10 nm to 300 nm, more preferably 40 nm to 200 nm. When the ink is synthesized such that the average particle diameter is less than 10 nm, the viscosity of the resin emulsion increases, and thus it is difficult to yield an ink viscosity which enables a printer to eject the ink. When the average particle diameter is greater than 300 nm, the particles clog a nozzle of the printer, and thus ejection failure arises.

The amount of silicone derived from the silicone-modified acrylic resin, contained in the ink of the present invention is preferably in the range of 100 ppm to 400 ppm. When the amount of silicone is less than 100 ppm, it is impossible to obtain a coating film superior in abrasion resistance or marker resistance. When the amount of silicone is greater than 400 ppm, there is an increase in hydrophobic property and a decrease in the stability of the silicone in the aqueous ink.

The minimum film forming temperature of the silicone-modified acrylic resin used in the ink of the present invention is preferably 20° C. or lower. When the minimum film forming temperature is higher than 20° C., sufficient fixation of the ink on a printing medium cannot be yielded. In other words, if a printed portion is scratched or marked with a marker, for example, the pigment (P1) becomes separated from the printed portion, thus smearing the printing medium.

Next, the following provides an explanation of why the total amount of the water-dispersible resin (A) and the colorant (B) of the present invention present in the ink is 5% by mass to 40% by mass, and the mass ratio (A)/(B) of the water-dispersible resin (A) to the colorant (B) is in the range of 0.5 to 4.

Printed matter capable of being firmly fixed onto the inexpensive medium in the present invention and comparable with commercial printed matter can be achieved by a combination of the ink and the medium described in the present invention; as for important factors concerning the ink in the present invention, it has been found in the present invention that the total solid content of the water-dispersible resin (A) and the colorant (B) in the ink and the ratio of the water-dispersible resin (A) to the colorant (B) are necessary factors in achieving the object.

Specifically, the total solid content of the water-dispersible resin (A) and the colorant (B) in the ink needs to be 5% by mass to 40% by mass. When the total solid content is less than 5% by mass, the ink is not sufficiently fixed onto the medium used in the present invention, for example. When the total solid content is greater than 40% by mass, the ink viscosity becomes so high that there is an adverse effect on the reliability of the ink in terms of ink ejection stability and the like. Additionally, the total solid content is preferably 5% by mass to 20% by mass. A pigment (P1) that contains resin in a dispersed manner or that is coated with resin can also be used depending upon the type of a coloring material described below, in which case a resin dispersant or the coating resin, and the water-dispersible resin (A) are added together as the resin solid content (A).

As for the fact that the mass ratio (A)/(B) of the water-dispersible resin (A) to the colorant (B) is in the range of 0.5 to 4, when the mass ratio is less than 0.5, the ink is not sufficiently fixed onto the medium used in the present invention, for example; when the mass ratio is greater than 4, the concentration of the coloring material is so low with respect to that of the resin that there are degradations of image quality such as a decrease in image density and a reduction in image uniformity. For this reason, in view of the medium used in the present invention, important factors concerning the ink used in the present invention are that the total amount of the water-dispersible resin (A) and the colorant (B) in the ink is 5% by mass to 40% by mass, and that the mass ratio (A)/(B) of the water-dispersible resin (A) to the colorant (B) is in the range of 0.5 to 4. It is more desirable that the mass ratio be in the range of 1 to 2.5 in terms of image quality.

Next, components constituting the ink of the present invention, and compositions thereof will be described.

Specific examples of the water-soluble organic solvent include the following compounds.

polyhydric alcohols such as ethylene glycol, diethylene glycol, triethylene glycol, propylene glycol, dipropylene glycol, tripropylene glycol, tetraethylene glycol, polyethylene glycol, polypropylene glycol, 1,3-butanediol, 3-methyl-1,3-butanediol, 2,3-butanediol, 1,4-butanediol, 1,5-pentanediol, 1,6-hexanediol, glycerol, 1,2,6-hexanetriol, 1,2,4-butanetriol, 1,2,3-butanetriol, 2-methyl-2,4-pentanediol, petriol and 3-methoxy-3-methyl-1-butanediol;

polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether;

polyhydric alcohol aryl ethers such as ethylene glycol monophenyl ether, ethylene glycol monobenzyl ether, dipropylene glycol monobutyl ether, tripropylene glycol monobutyl ether, diethylene glycol isobutyl ether, triethylene glycol isobutyl ether and diethylene glycol isopropyl ether;

nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam and γ-butyrolactone;

amides such as N-methylformamide and N,N-dimethylformamide;

amines such as monoethanolamine, diethanolamine, triethanolamine, monoethylamine, diethylamine and triethylamine;

sulfur-containing compounds such as dimethyl sulfoxide, sulfolane, thiodiethanol and thiodiglycol; and propylene carbonate and ethylene carbonate.

Among these organic solvents, particular preference is given to glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, N-hydroxyethyl-2-pyrrolidone and 1,3-dimethyl-2-imidazolidinone. These compounds make it possible to obtain excellent effects with respect to solubility and prevention of ejection failure caused by moisture evaporation.

The pigment ink essential for the present invention includes at least water, a colorant in the form of particles, a fixative for the colorant, and a water-soluble organic solvent, also includes a wetting agent and a surfactant, and further includes other components in accordance with the necessity.

As to the object of the present invention, a fluorochemical surfactant having a specific structure is used as the surfactant, the mass ratio of the colorant (B) to the water-dispersible resin (A) is lowered, and at least one selected from an anionic self-emulsifiable ether-based polyurethane resin emulsion and an acrylic-silicone resin emulsion is contained in the water-dispersible resin; thus, printed matter capable of being firmly fixed onto the inexpensive medium of the present invention and comparable with commercial printed matter can be achieved by a combination of the ink and the medium.

Examples of the colorant (B) include dyes such as water-soluble dyes, oil-soluble dyes and disperse dyes, and the pigment (P1). Oil-soluble dyes and disperse dyes are preferable in terms of adsorption and encapsulation, while the pigment (P1) is preferable in terms of the light resistance of images obtained.

It is desirable that each of the dyes dissolve in an organic solvent, e.g. a ketone-based solvent, at a rate of 2 g/l or greater, more desirably at a rate of 20 g/l to 600 g/l, in view of the fact that the dyes can be efficiently encapsulated in fine polymer particles.

The colorant (B) used in the present invention will be explained below.

Examples of the pigment (P1) used in the present invention include the following: as a black pigment, carbon black; as color pigments, anthraquinone, phthalocyanine blue, phthalocyanine green, diazo, monoazo, pyranthron, perylene, heterocyclic yellow, quinacridone and (thio)indigoid. Typical examples of phthalocyanine blue include copper phthalocyanine blue and derivatives thereof (Pigment Blue 15). Typical examples of quinacridone include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Typical examples of anthraquinone include Pigment Red 43, Pigment Red 194 (perinone red), Pigment Red 216 (brominated pyranthron red) and Pigment Red 226 (pyranthron red). Typical examples of pyrelyne include Pigment Red 123 (vermillion), Pigment Red 149 (scarlet), Pigment Red 179 (maroon), Pigment Red 190 (red), Pigment Violet, Pigment Red 189 (yellow shade red) and Pigment Red 224. Typical examples of thioindigoid include Pigment Red 86, Pigment Red 87, Pigment Red 88, Pigment Red 181, Pigment Red 198, Pigment Violet 36 and Pigment Violet 38. Typical examples of heterocyclic yellow include Pigment Yellow 117 and Pigment Yellow 138. Other suitable examples of coloring pigments are described in "The Colour Index, third ed., The Society of Dyers and Colourists, 1982", for instance.

For the pigment (P1) in the ink of the present invention, it is possible to use a pigment that is provided with at least one hydrophilic group, which is bonded to the pigment surface directly or via other atomic group, and that can therefore be stably dispersed without using a dispersant. The pigment (P1) of the present invention provided with a hydrophilic group, which is introduced onto the pigment surface, preferably has ionic properties, and an anionically charged pigment or a cationically charged pigment is suitable for the pigment (P1).

Examples of anionic hydrophilic groups include —COOM, —SO$_3$M, —PO$_3$HM, —PO$_3$M$_2$, —SO$_2$NH$_2$ and —SO$_2$NHCOR (in these formulae, M denotes a hydrogen atom, an alkali metal, ammonium or an organic ammonium, and R denotes an alkyl group having 1 to 12 carbon atoms, a phenyl group that may have a substituent, or a naphthyl group that may have a substituent). In the present invention, among these, use of —COOM and —SO$_3$M, each of which is bonded to the pigment surface, is particularly preferable. Examples of methods for obtaining an anionically charged pigment include a method of oxidizing a pigment with sodium hypochlorite, a method utilizing sulfonation, and a method of making a pigment and a diazonium salt react together; however, it should be noted that the present invention may employ other methods.

As the hydrophilic group bonded to the surface of the cationically charged pigment (P1), a quaternary ammonium group can be used, for instance. Ideally, a pigment provided with at least one of the following quaternary ammonium groups, which is bonded to the pigment surface, is used as the pigment (P1).

As to the pigment (P1) used in the ink of the present invention, a pigment dispersion in which the pigment (P1) is dispersed in an aqueous medium by a dispersant can also be used. Suitable examples of the dispersant include known dispersants used in preparing pigment dispersion solutions; specifically, the suitable examples include the following compounds.

Polyacrylic acid, polymethacrylic acid, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid copolymers-acrylic acid alkyl ester copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers and vinyl acetate-acrylic acid copolymers.

A nonionic dispersant or an anionic dispersant used to disperse the pigment (P1) may be suitably selected according to the type of the pigment (P1) or the ink formulation; examples of the nonionic dispersant include polyoxyethylene alkyl ethers such as polyoxyethylene lauryl ether, polyoxyethylene myristyl ether, polyoxyethylene cetyl ether, polyoxyethylene stearyl ether and polyoxyethylene oleyl ether; polyoxyethylene alkylphenyl ethers such as polyoxyethylene octylphenyl ether and polyoxyethylene nonylphenyl ether; polyoxyethylene α-naphthyl ether, polyoxyethylene β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, polyoxyethylene distyrylnaphthyl ether, and polyoxyethylene-polyoxypropylene block copolymers. Also, it is possible to use dispersants produced by replacing part of the polyoxyethylene of these dispersants with polyoxypropylene, and dispersants produced by condensing aromatic ring-containing compounds such as polyoxyethylene alkylphenyl ethers, using formalin or the like.

The HLB of the nonionic dispersant is preferably in the range of 12 to 19.5, more preferably in the range of 13 to 19. When the HLB is less than 12, the dispersant is not compatible with the dispersion medium, and thus the dispersion stability tends to degrade. When the HLB is greater than 19.5, the dispersant does not easily adsorb to the pigment (P1), and thus the dispersion stability tends to degrade in this case as well.

It is particularly desirable that the nonionic dispersant be selected from compounds represented by Structural Formula (2) below. By dispersing the pigment (P1) with the use of any of these compounds, the average particle diameter of the pigment (P1) becomes small, and the particle size distribution can be made narrower. The polymerization degree n of the ethylene oxide moiety in Structural Formula (2) given below is preferably in the range of 20 to 200, more preferably in the range of 25 to 60. In the case where n is less than 20, the dispersion stability lowers, the average particle diameter of the pigment (P1) becomes large, and the color saturation of images tends to decrease. In the case where n is greater than 200, the viscosity of the pigment dispersion becomes high, the ink viscosity becomes high as well when an ink has been prepared, and printing based upon an ink-jet recording method tends to become difficult to achieve.

Structural Formula (2)

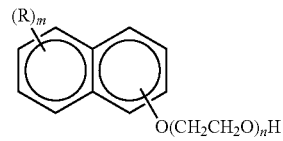

(In Structural Formula (2), R denotes an alkyl group having 1 to 20 carbon atoms, m denotes an integer of 0 to 7, and n denotes an integer of 20 to 200.)

Examples of the alkyl group include methyl group, ethyl group, n-propyl group, i-propyl group, n-butyl group, i-butyl group, t-butyl group, n-pentyl group, i-pentyl group, n-hexyl group, i-hexyl group, n-heptyl group, i-heptyl group, n-octyl group, i-octyl group, n-nonyl group, i-nonyl group, n-decyl group, i-decyl group, n-undecyl group, i-undecyl group, n-dodecyl group, i-dodecyl group, cyclopropyl group, cyclobutyl group, cyclopentyl group, cyclohexyl group, cycloheptyl group and cyclooctyl group.

Examples of the anionic dispersant include polyoxyethylene alkyl ether sulfates, polyoxyethylene alkylphenyl ether sulfates, polyoxyethylene monostyrylphenyl ether sulfates, polyoxyethylene distyrylphenyl ether sulfates, polyoxyethylene alkyl ether phosphates, polyoxyethylene alkylphenyl ether phosphates, polyoxyethylene monostyrylphenyl ether phosphates, polyoxyethylene distyrylphenyl ether phosphates, polyoxyethylene alkyl ether carboxylates, polyoxyethylene alkylphenyl ether carboxylates, polyoxyethylene monostyrylphenyl ether carboxylates, polyoxyethylene distyrylphenyl ether carboxylates, formalin condensates of naphthalene sulfonates, formalin condensates of melanin sulfonates, dialkylsulfosuccinic acid ester salts, disodium alkyl sulfosuccinates, disodium polyoxyethylene alkylsulfosuccinates, alkylsulfoacetates, α-olefin sulfonates, alkyl benzene sulfonates, alkyl naphthalene sulfonates, alkyl sulfonates, N-acylamino acid salts, acylated dipeptides and soaps. Among these, particular preference is given to sulfates and phosphates of polyoxyethylene alkyl ethers, polyoxyethylene alkylphenyl ethers and polyoxyethylene distyrylphenyl ethers.

The amount of the dispersant added preferably equals 10% by mass to 50% by mass of the amount of the pigment (P1). When the amount of the dispersant added equals less than 10% by mass of the amount of the pigment (P1), the storage stability of the pigment (P1) dispersion and the ink lowers, or dispersion takes a great deal of time. When the amount of the dispersant added equals more than 50% by mass of the amount of the pigment (P1), the ink viscosity becomes too high, and thus the ejection stability tends to lower.

Further, for the colorant (B), a resin-coated colorant can also be suitably used as explained below.

The resin-coated colorant is made of a polymer emulsion in which fine polymer particles contain a coloring material which is insoluble or sparingly soluble in water. In the present specification, the expression "fine polymer particles contain a coloring material" means either or both of a state in which the coloring material is encapsulated in the fine polymer particles, and a state in which the coloring material is adsorbed on the surface of the fine polymer particles. In this case, it is not that all of the coloring material included in the ink of the present invention needs to be encapsulated in or adsorbed on the fine polymer particles but that the coloring material may be dispersed in the emulsion to such an extent that the effects of the present invention are not impaired. The coloring material is not particularly limited and may be suitably selected in accordance with the intended use, as long as it is insoluble or sparingly soluble in water and can be adsorbed by the polymer. In the present specification, the expression "insoluble or sparingly soluble in water" means that not more than 10 parts by mass of the coloring material dissolves in 100 parts by mass of water at 20° C., whereas the term "dissolve" means that neither division nor sedimentation of the coloring material is confirmed at the surface layer or bottom layer of the aqueous solution by visual observation. Examples of the coloring material include dyes such as oil-soluble dyes and disperse dyes, and the pigment (P1). Oil-soluble dyes and disperse dyes are preferable in terms of to adsorption and encapsulation, while the pigment (P1) is preferable in terms of the light resistance of images obtained.

It is desirable that the colorant (B) of the present invention dissolve in an organic solvent, e.g. a ketone-based solvent, at a rate of 2 g/l or greater, more desirably at a rate of 20 g/l to 600 g/l, in view of the fact that the colorant (B) can be efficiently encapsulated in fine polymer particles. Examples of the polymer constituting the polymer emulsion include vinyl-based polymers, polyester-based polymers and polyurethane-based polymers. Among these, particular preference is given to vinyl-based polymers and polyester-based polymers, specifically the polymers disclosed in JP-A Nos. 2000-53897 and 2001-139849. The amount of the colorant is preferably 10 parts by mass to 200 parts by mass, more preferably 25 parts by mass to 150 parts by mass, per 100 parts by mass of the polymer. The fine polymer particles containing the colorant preferably have an average diameter of 0.16 μm or less in the ink.

The amount of the fine polymer particles contained in the recording ink is preferably 8% by mass to 20% by mass, more preferably 8% by mass to 12% by mass, as a solid content.

As the colorant used in the present invention, the pigment (P1) is most favorable. Meanwhile, for the resin-coated colorant, a dye can be used as well. The following shows a set of examples of water-soluble dyes. It is desirable that those superior in water resistance and light resistance be used.

Specific examples of the dyes include acid dyes and food dyes such as C.I. Acid Yellow 17, 23, 42, 44, 79 and 142; C.I. Acid Red 1, 8, 13, 14, 18, 26, 27, 35, 37, 42, 52, 82, 87, 89, 92, 97, 106, 111, 114, 115, 134, 186, 249, 254 and 289; C.I. Acid Blue 9, 29, 45, 92 and 249; C.I. Acid Black 1, 2, 7, 24, 26 and 94; C.I. Food Yellow 3 and 4; C.I. Food Red 7, 9 and 14; and C.I. Food Black 1 and 2.

Specific examples of the dyes include direct dyes such as C.I. Direct Yellow 1, 12, 24, 26, 33, 44, 50, 86, 120, 132, 142 and 144; C.I. Direct Red 1, 4, 9, 13, 17, 20, 28, 31, 39, 80, 81, 83, 89, 225 and 227; C.I. Direct Orange 26, 29, 62 and 102; C.I. Direct Blue 1, 2, 6, 15, 22, 25, 71, 76, 79, 86, 87, 90, 98, 163, 165, 199 and 202; and C.I. Direct Black 19, 22, 32, 38, 51, 56, 71, 74, 75, 77, 154, 168 and 171.

Specific examples of the dyes include basic dyes such as C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Black 2 and 8.

Specific examples of the dyes include reactive dyes such as C.I. Reactive Black 3, 4, 7, 11, 12 and 17; C.I. Reactive Yellow 1, 5, 11, 13, 14, 20, 21, 22, 25, 40, 47, 51, 55, 65 and 67; C.I. Reactive Red 1, 14, 17, 25, 26, 32, 37, 44, 46, 55, 60, 66, 74, 79, 96 and 97; and C.I. Reactive Blue 1, 2, 7, 14, 15, 23, 32, 35, 38, 41, 63, 80 and 95.

In the present invention, use of a surfactant, notably the fluorochemical surfactant having a specific structure, makes it possible to improve the wettability and penetrability of the ink to recording paper. Fluorochemical surfactants are generally known to have high foaming properties, and inks containing those fluorochemical surfactants easily foam in many cases, causing adverse effects on the ink feeding capability and the ink ejection stability; however, the fluorochemical surfactant having a specific structure in the present invention is reduced in foaming property, superior in ink feeding capability and ink ejection stability and excellent in safety, and makes it possible to yield high color-developing properties and uniformity of a coloring material on the ink-jet recording medium used in the present patent and reduce beading greatly, and thus excellent images can be obtained. Although details as to why its effectiveness can be obtained are not known, it is inferred that the fluorochemical surfactant having a specific structure in the present invention is, due to its structure, superior in leveling ability, highly effective in making uniform the surface tension at the gas-liquid interface, and therefore superior in antifoaming ability, and that the leveling ability has an effect of evenly dispersing the coloring material and evenly enlarging image element diameters in a wet manner on the ink-jet recording medium, which enables beading to be greatly reduced, thereby making it possible to provide an ink-jet recording ink, an ink-jet recording ink set, an ink-jet recording ink media set, an ink cartridge, an ink-jet recording method and an ink-jet recording apparatus, wherein a combination of the ink-jet pigment ink and the ink-jet recording medium shown in the present invention makes it possible to obtain printed matter which is inexpensive, excellent in quality, superior in density, glossiness and image reliability and comparable with commercial printed matter, and it is possible to secure superior reliability in terms of ejection stability, storage stability and the like.

In addition to the fluorochemical surfactant represented by Structural Formula (1) in the present invention, any of the following fluorochemical surfactants can be used: perfluoroalkyl sulfonates, perfluoroalkyl carboxylates, perfluoroalkyl phosphoric acid esters, perfluoroalkyl ethylene oxide adducts, perfluoroalkyl betaine, perfluoroalkyl amine oxide compounds and the like. Examples of those which are commercially available as fluorine-based compounds, easily obtainable and able to be used in the present invention include SURFLON S-111, S-112, S-113, 5121, 5131, S132, S-141 and S-145 (produced by Asahi Glass Co., Ltd.), FLUORAD FC-93, FC-95, FC-98, FC-129, FC-135, FC-170C, FC-430, FC-431 and FC-4430 (produced by Sumitomo 3M Limited), MEGAFAC F-470, F-1405 and F474 (produced by Dainippon Ink And Chemicals, Incorporated), ZONYL FS-300, FSN, FSN-100 and FSO (produced by E. I. du Pont de Nemours and Company), and EFTOP EF-351, 352, 801 and 802 (produced by JEMCO Inc.). Among these, particular preference is given to ZONYL FS-300, FSN, FSN-100 and FSO (produced by E. I. du Pont de Nemours and Company), which are excellent in reliability and improving color development.

Examples of surfactants able to be used in addition to the above-mentioned fluorochemical surfactants include interfacial polyoxyethylene alkyl ether acetates, dialkyl sulfosuccinates, polyoxyethylene alkyl esters, polyoxyethylene alkylphenyl ethers, polyoxyethylene-polyoxypropylene block copolymers, polyoxyethylene alkyl esters, polyoxyethylene sorbitan fatty acid esters and acetylene glycol-based surfactants. More specifically, as to anionic surfactants, use of a polyoxyethylene alkyl ether acetate and/or a dialkyl sulfosuccinate having a branched alkyl chain whose carbon chain has 5 to 7 carbon atoms makes it possible to improve the wettability of the ink to plain paper. Note that any of these surfactants can be stably present in the ink of the present invention without disturbing the dispersed state of ingredients.

A polyol having 7 to 11 carbon atoms, used as a penetrant in the present invention, can be any one of 2-ethyl-1,3-hexanediol and 2,2,4-trimethyl-1,3-pentanediol, for example. The amount of the polyol added is preferably in the range of 0.1% by mass to 20% by mass, more preferably in the range of 0.5% by mass to 10% by mass. When the amount is smaller than or equal to the lower limit, the penetrability of the ink to paper degrades; therefore, the paper may be smeared when conveyed, as recorded matter is possibly scratched by a roller, or the paper may be smeared when reversed for double-sided printing, as the ink is possibly attached to a conveyance belt, and thus it is impossible to secure sufficient adaptability to high-speed printing or double-sided printing. When the amount is greater than or equal to the upper limit, there may be an increase in printing dot diameter, thereby possibly causing the line width of letters/characters to increase, or causing the image clarity to decrease.

Examples of additives include an antifungal agent, an antirust agent and a pH adjuster.

Use of 1,2-benzisothiazolin-3-one as an antifungal agent makes it possible to provide an ink capable of securing reliability in terms of storage stability, ejection stability and the like, and superior in antifungal effect. Especially when combined with the wetting agent of the present invention, the antifungal agent can be sufficiently effective even if its amount is deemed too small in related art to reduce the generation of germs or fungi; thus, by reducing the amount of the antifungal agent added, it becomes possible to prevent such phenomena as flocculation of particles and thickening of ink, and so the performance of the ink can be maintained for a long period of time. As an active ingredient amount, the amount of 1,2-benzisothiazolin-3-one added is preferably 0.01 parts by mass to 0.04 parts by mass in relation to the total amount of the ink. In the case where the amount is less than 0.01 parts by mass, there is a slight reduction in antifungal property. In the case where the amount is 0.04 parts by mass or greater, flocculation of particles arises or the ink viscosity increases by 50% to 100% in comparison with the initial ink viscosity, when the ink is stored for a long period of time (e.g. for two years at room temperature, or for one to three months at a temperature of 50° C. to 60° C.), for example; hence, there is a problem with the long-term storage stability of the ink, and the initial printing performance cannot be maintained.

For the pH adjuster, any substance may be used as long as it can adjust the pH to 7 or greater without having an adverse effect on the ink to be prepared.

Examples of the pH adjuster include amines such as diethanolamine and triethanolamine; hydroxides of alkali metals such as lithium hydroxide, sodium hydroxide and potassium hydroxide; ammonium hydroxide, hydroxides of quaternary ammonium, and hydroxides of quaternary phosphonium; carbonates of alkali metals such as lithium carbonate, sodium carbonate and potassium carbonate; and aminopropanediol derivatives. Aminopropanediol derivatives are water-soluble organic basic compounds, and examples thereof include 1-amino-2,3-propanediol, 1-methylamino-2,3-propanediol, 2-amino-2-methyl-1,3-propanediol and 2-amino-2-ethyl-1,3-propanediol, with particular preference being given to 2-amino-2-ethyl-1,3-propanediol.

Examples of the antirust agent include acid sulfites, sodium thiosulfate, ammonium thiodiglycolate, diisopropylammonium nitrite, pentaerythritol tetranitrate and dicyclohexylammonium nitrite.

Also, a water-soluble ultraviolet absorber, a water-soluble infrared absorber or the like may be added to the antirust agent in accordance with the intended use.

(Ink-Jet Recording)

In the present invention, the total amount of the ink needs to be strictly controlled in order to secure drying properties of the ink as well as to prevent the coloring material (pigment (P1)) in the ink from soaking into a medium and efficiently make the coloring material present in the vicinity of the medium surface; if a large amount of ink is used as in conventional ink-jet recording, the pigment (P1) in the ink possibly penetrates into the medium along with the ink solvent because the pigment separating ability of a barrier layer becomes insufficient for the large amount of ink, or there is possibly a great problem with the ink drying capability because solvent components of the ink may not penetrate into the medium as quickly as they should. It has turned out that in view of the barrier layer performing its function, the total amount of ink is 15 $g/m^2$ at the most, preferably 12 $g/m^2$ or less. The ink amount can be easily adjusted by controlling the amount of the penetrant (EHD) and the amount of the fluorochemical surfactant, etc. Also, by reducing the total amount of ink necessary for printing, it is possible to make the capacity of an ink cartridge smaller than in a conventional ink-jet printer and thus to make an apparatus compact. Additionally, when an ink cartridge having a size similar to that of a conventional ink cartridge is used, the rate at which the ink cartridge is replaced can be reduced, and thus printing becomes possible at a lower cost. Basically, the smaller the total amount of ink is, the greater the pigment separating ability of the barrier layer is; however, if the total amount of ink is too small, there is such a drawback that the image dot diameter becomes too small after printing, so that it is desirable to set the total amount of ink within the above-mentioned range in accordance with a desired image.

In the present invention, the total amount of ink is measured in accordance with a weight method. Specifically, a 5 cm×20 cm rectangle is printed onto a sheet of TYPE 6200 (produced by Ricoh Company, Ltd.), which is PPC paper, then the weight of the printed sheet is measured immediately after the printing, the weight of the sheet before the printing is subtracted from the measured weight, and the obtained value is multiplied by 100 so as to serve as the total amount of ink.

The highly penetrative ink of the present invention can also be used for printing onto a conventional void-type ink-jet medium. It should, however, be noted that since the ink absorption rate is far higher than in the case where the ink is used for printing onto the recording medium of the present invention, the solvent penetrates into the void-type ink-jet medium before dots spread in a wet manner, after ink droplets have come into contact with the medium surface, and thus the dot diameter becomes small. Consequently, the image density easily decreases, and particles become easier to notice in an image. Thus, production of a high-quality image requires printing which is higher in resolution than printing onto the recording medium of the present invention, thereby leading to a decrease in printing speed and an increase in ink consumption. Hence, it is desirable to use the recording medium of the present invention.

(Recording Media)

Examples of the inorganic pigment (P2) contained in the barrier layer in the present invention include magnesium carbonate, talc, kaolin, illite, clay, calcium carbonate, calcium sulfite, titanium white, magnesium carbonate and titanium dioxide. Each of these pigments (P2) preferably has an average particle diameter of 3 µm or less. Use of a pigment with a relatively high refractive index among these pigments (P2) makes it possible to reduce the thickness of the barrier layer. In terms of cost, use of calcium carbonate or kaolin is preferable. These pigments (P2) may be used in combination as long as the effects of the present invention are not impaired; also, these pigments (P2) may be combined with other pigments (P2) not included in the above-mentioned examples. Kaolin is preferable in that it is superior in gloss developing property and makes it possible to yield a texture which approximates that of paper for offset printing. Examples of the kaolin include delaminated kaolin, calcined kaolin, and engineered kaolin produced by surface modification or the like. In view of gloss developing properties, it is desirable that 50% by mass or more of the whole kaolin be occupied by kaolin having a particle size distribution in which 80% by mass or more of the particles are 2 µm or less in diameter. The amount of the kaolin contained is preferably 50 parts by mass or more. When the amount is less than 50 parts by mass, sufficient effectiveness may not be obtained with respect to glossiness.

Although the upper limit of the amount of the kaolin contained is not particularly limited, it is desirable in terms of coating suitability that the amount be less than 90 parts by mass, in view of the kaolin's fluidity, especially thickening properties in the presence of high shearing force.

These pigments (P2) that have high refractive indices may be used in combination with silica and/or organic pigments (P2) that have low refractive indices. Examples of the organic pigments (P2) include water-soluble dispersions containing styrene-acrylic copolymer particles, styrene-butadiene copolymer particles, polystyrene particles, polyethylene particles, etc. Each of these organic pigments (P2) may be used in combination with two or more. The organic pigments (P2) are superior in gloss developing property and smaller in specific gravity than the inorganic pigments (P2), thereby making it possible to obtain coating layers which are bulky, highly glossy and excellent in surface coating property; the amount of any of the organic pigments (P2) added is preferably 2 parts by mass to 5 parts by mass. When the amount is less than 2 parts by mass, such effects cannot be obtained. When the amount is greater than 5 parts by mass, ink strike-through is liable to arise, and also the cost will rise, which is economically unfavorable. Examples of the forms of the organic pigments (P2) include dense type, hollow type and doughnut type; in light of a balance among the gloss developing property, the surface coating property, and the fluidity of coating solution, it is desirable that the organic pigments (P2) be in the range of 0.2 µm to 3.0 µm in average particle diameter, and it is further desirable to employ a hollow-type organic pigment having a void ratio of 40% or more.

The binder of the layer for preventing pigment penetration (barrier layer) used in the present invention is not particularly limited as long as it firmly adheres to the pigment and base paper that constitute the barrier layer and it is made of an aqueous resin, an emulsion or the like which does not cause blocking.

Examples of the aqueous binder include polyvinyl alcohol; starches such as starch oxide, esterified starch, enzyme-modified starch and cationated starch; cellulose derivatives such as casein, soya bean proteins, carboxymethyl cellulose and hydroxyethyl cellulose; and styrene-acrylic copolymer resins, isobutylene-maleic anhydride copolymer resins, acrylic emulsions, vinyl acetate emulsions, vinylidene chloride emulsions, polyester emulsions, styrene-butadiene copolymer latex and acrylonitrile-butadiene copolymer latex. Among these, use of starches or styrene-butadiene copolymer latex is preferable in terms of cost. The styrene-butadiene copolymer latex contains styrene and butadiene as monomers, and these monomers may be copolymerized with other monomers according to the necessity, or the styrene-butadiene copolymer latex may be copolymer latex commonly used for paper coating, in which the copolymer has been modified by chemical reaction. Typical examples of the other monomers include vinyl-based monomers such as acrylic acid, methacrylic acid, alkyl esters of (meth)acrylic acid, acrylonitrile, maleic acid, fumaric acid and vinyl acetate. Also, the styrene-butadiene copolymer latex may contain a cross-linking agent such as methylolated melamine, methylolated urea, methylolated hydroxypropylene urea or isocyanate or may be a copolymer with self-crosslinking ability that includes N-methylolacrylamide or other unit. Each of these may be used alone or in combination with two or more.

The amount of the aqueous binder added into the barrier layer in the present invention is preferably 50% by mass to 70% by mass, more preferably 55% by mass to 60% by mass, in relation to the total coating layer solid content. When the amount is smaller than the lower limit, the barrier layer is deficient in adhesion, and thus there is concern that the strength of the ink receiving layer might decrease, the internal bonding strength might decrease, and detachment of particles might arise.

Further, other components may be added to the barrier layer of the present invention in accordance with the necessity, to such an extent that the object and effects of the present invention are not impaired. Examples of the other components include auxiliary agents contained in pigments for ordinary coated paper, such as a dispersant, a thickener, a water retention agent, an antifoaming agent and a water resistant additive; and additives such as a pH adjuster, an antiseptic agent, an antioxidant and a cationic organic compound.

A surfactant used in the barrier layer is not particularly limited and may be suitably selected in accordance with the intended use. For the surfactant, any one of an anionic surfactant, a cationic surfactant, an amphoteric surfactant and a nonionic surfactant may be used, with particular preference being given to a nonionic surfactant.

Examples of the nonionic surfactant include higher alcohol ethylene oxide adducts, alkylphenol ethylene oxide adducts, fatty acid ethylene oxide adducts, polyhydric alcohol fatty acid ester ethylene oxide adducts, higher aliphatic amine ethylene oxide adducts, fatty acid amide ethylene oxide adducts, ethylene oxide adducts of fats, polypropylene glycol ethylene oxide adducts, fatty acid esters of glycerol, fatty acid esters of pentaerythritol, fatty acid esters of sorbitol and sorbitan, fatty acid esters of sucrose, alkyl ethers of polyhydric alcohols, and fatty acid amides of alkanolamines. Each of these may be used alone or in combination with two or more.

The polyhydric alcohols are not particularly limited and may be suitably selected in accordance with the intended use. Examples thereof include glycerol, trimethylolpropane, pentaerythrite, sorbitol and sucrose. As to the ethylene oxide adducts, ones in which an alkylene oxide, for example propylene oxide or butylene oxide, is substituted for part of ethylene oxide to such an extent that their water solubility can be maintained are also effective; in this case, the substitution ratio is preferably 50% or less. The HLB (hydrophile-lipophile balance) of the nonionic surfactant is preferably 4 to 15, more preferably 7 to 13.

A cationic organic compound is not necessarily required, and a cationic organic compound is not particularly limited and may be suitably selected in accordance with the intended use.

Examples of the cationic organic compound include dimethylamine-epichlorhydrin polycondensates, dimethylamine-ammonia-epichlorhydrin condensates, poly(triethylaminoethyl methacrylate-methylsulfate), diallylamine hydrochloride-acrylamide copolymers, poly(diallylamine hydrochloride-sulfur dioxide), polyallylamine hydrochloride, poly(allylamine hydrochloride-diallylamine hydrochloride), acrylamide-diallylamine copolymers, polyvinylamine copolymers, dicyandiamide, dicyandiamide-ammonium chloride-urea-formaldehyde condensates, polyalkylene polyamine-dicyandiamide ammonium salt condensates, dimethyldiallylammonium chloride, polydiallylmethylamine hydrochloride, poly(diallyldimethylammonium chloride), poly(diallyldimethylammonium chloride-sulfur dioxide), poly(diallyldimethylammonium chloride-diallylamine hydrochloride derivatives), acrylamide-diallyldimethylammonium chloride copolymers, acrylate-acrylamide-diallylamine hydrochloride copolymers, polyethylenimine, ethylenimine derivatives such as acrylamine polymers, and modified products of polyethylenimine alkylene oxides. Each of these may be used alone or in combination with two or more.

The support used in the present invention is produced by mixing together chemical pulp, mechanical pulp, recycled pulp and the like with an arbitrary ratio, and the raw materials to which an internally added sizing agent, a yield improver, a paper strength increasing agent and the like have been added in accordance with the necessity are made into paper using, for example, a fourdrinier former, a gap-type twin-wire former, or a hybrid former in which a posterior portion of a fourdrinier section is composed of twin wires.

The pulp used in the support of the present invention may contain a virgin chemical pulp (CP), for example one produced by chemically treating a wood material such as leaf bleached kraft pulp, needle bleached kraft pulp, leaf unbleached kraft pulp, needle unbleached kraft pulp, leaf bleached sulfite pulp, needle bleached sulfite pulp, leaf unbleached sulfite pulp or needle unbleached sulfite pulp, or other fiber raw material; and a virgin mechanical pulp (MP), for example one produced by mechanically treating a wood material such as ground pulp, chemiground pulp, chemimechanical pulp or semi-chemical pulp, or other fiber raw material.

Also, recycled pulp may be used as well, and examples of the raw material for the recycled pulp include articles shown in the "Used Paper Standard Quality Specification List" released by Paper Recycling Promotion Center, such as high-quality white paper, white paper with lines and marks, cream-colored paper, card, medium-quality white paper, low-quality white paper, simili paper, white-colored paper, Kent paper, white art paper, medium-quality colored paper, low-quality colored paper, newspaper and magazine.

Specific examples thereof include used paperboards and used papers of the following papers: printer papers such as uncoated computer paper, thermosensitive paper and pressure-sensitive paper that are related to information; OA (office automation) related papers such as paper for PPC (plain paper copier); coated papers such as art paper, coated paper, finely coated paper and matte paper; and uncoated papers such as high-quality paper, high color quality paper, notebook, letter paper, packing paper, fancy paper, medium-quality paper, newspaper, woody paper, super wrapping paper, simili paper, pure white roll paper and milk carton. More specific examples thereof include chemical pulp paper and high-yield pulp-containing paper. Each of these may be used alone or in combination with two or more.

The recycled pulp is generally produced by a combination of the following four steps.

(1) Defibration: used paper is treated with mechanical force and chemicals using a pulper and thusly fiberized, and printing ink is separated from the fiber.

(2) Dust removal: foreign matter (plastic, etc.) and dust contained in the used paper is removed by a screen, a cleaner or the like.

(3) Ink removal: the printing ink that has been separated from the fiber using a surfactant is removed from the system by a flotation method or washing method.

(4) Bleaching: the whiteness of the fiber is enhanced utilizing oxidation or reduction.

When the recycled pulp is mixed with other pulp, it is desirable that the mixture ratio of the recycled pulp in the whole pulp be 40% or less so as to prevent curl after recording.

For a filler able to be used in the support of the present invention, use of calcium carbonate is effective, and the following materials may be additionally used: inorganic fillers exemplified by silicates such as kaolin, fired clay, pyrophyllite, sericite and talc; and organic pigments (P2) such as satin white, barium sulfate, calcium sulfate, zinc sulfide, plastic pigments and urea resins.

The internally added sizing agent used in the support of the present invention is not particularly limited and may be suitably selected from known internally added sizing agents used for ink-jet recording paper. Suitable examples of the internally added sizing agent include rosin emulsion sizing agents. Examples of the internally added sizing agent used in producing the support include neutral rosin sizing agents used in neutral papermaking, alkenyl succinic anhydrides (ASA), alkyl ketene dimers (AKD) and petroleum resin sizing agents. Among these, neutral rosin sizing agents and alkenyl succinic anhydrides are particularly suitable. Although the alkyl ketene dimers can be added in small amounts due to their strong sizing effects, they may be unfavorable in terms of paper conveyance at the time of inkjet recording because the friction coefficient of the recording paper (medium) surface decreases and thus the surface easily becomes slippery.

The amount of the internally added sizing agent used is preferably 0.1 parts by mass to 0.7 parts by mass per 100 parts by mass of bone-dry pulp; however, the amount is not limited thereto.

For the internally added filler in the support, a pigment which is conventionally known as a white pigment (P2) is used, for instance. Examples of the white pigment (P2) include white inorganic pigments (P2) such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate and magnesium hydroxide; and organic pigments (P2) such as styrene-based plastic pigments, acrylic plastic pigments, polyethylene, microcapsules, urea resins and melamine resins. Each of these may be used alone or in combination with two or more.

<Method for Producing Barrier Layer>

The method for providing the barrier layer over the support of the present invention by coating is not particularly limited. For instance, it is possible to utilize a method of directly coating a support with a barrier layer, a method in which a barrier layer that has been applied onto another base material is transferred onto original paper, or a method of applying a barrier layer in the form of a mist, using a spray or the like. Examples of the method of directly coating a support with a barrier layer include film transfer methods such as roll coater method, air knife coater method, gate roll coater method, size pressing, Symsizer method, and rod metalling size press coater method; and blade coater methods such as fountain method and roll application.

The barrier layer can be dried using a hot-air drying oven or a thermal drum, for instance. Further, the barrier layer may be subjected to a surface-finishing process using a calendering device (supercalender, soft calender, gloss calender, etc.) so as to flatten its surface or increase the strength of its surface.

The barrier layer of the present invention can be provided by coating, as described above; in addition, as a result of carrying out an earnest study, the present inventors have found that the barrier layer of the present invention can also be produced by polishing the surface of existing coated paper for printing. It is inferred that this is possible because the thickness of the coat layer is reduced by the polishing to the thickness shown in the present invention, a resin layer present on the outermost surface is shaved, which makes pores appear, and thus a layer functioning as a barrier layer is obtained.

The existing coated paper for printing denotes coated paper used for commercial printing exemplified by offset printing, gravure printing, etc., and examples thereof include art paper (A0, A1), A2 coated paper, A3 coated paper, B2 coated paper, light coated paper and finely coated paper.

The following shows examples of the coated paper as specific products. Examples thereof as art paper include OK KINFUJI N, OK KINFUJI-R40N, SA KINFUJI N, SATIN KINFUJI N, SATIN KINFUJI-R40N, ULTRA-SATIN KINFUJI N, ULTRA-OK KINFUJI N and KINFUJI SINGLE SIDE (produced by Oji paper Co., Ltd.); NPi SPECIAL ART, NPi SUPER ART, NPi SUPER DULL and NPi DULL ART (produced by Nippon Paper Group, Inc.); UTRILLO SUPER ART, UTRILLO SUPER DULL and UTRILLO PREMIUM (produced by Daio Paper Corporation); HIGH-GRADE ART A, SPECIAL MITSUBISHI ART, SUPER MAT ART A and HIGH-GRADE DULL ART A (produced by Mitsubishi Paper Mills Limited); and RAICHO SUPER ART N, RAICHO SUPER ART MN, RAICHO SPECIAL ART and RAICHO DULL ART N (produced by Chuetsu Pulp & Paper Co., Ltd.).

Examples thereof as A2 coated paper include OK TOP COAT+(PLUS), OK TOP COAT S, OK CASABLANCA, OK CASABLANCA V, OK TRINITY, OK TRINITY NAVI, NEW AGE, NEW AGE W, OK TOP COAT MATT N, OK ROYAL COAT, OK TOP COAT DULL, Z COAT, OK KASAHIME, OK KASAO, OK KASAO SATIN, OK TOP COAT+, OK NON-WRINKLE, OK COAT V, OK COAT N GREEN 100, OK MATT COAT GREEN 100, NEW AGE GREEN 100 and Z COAT GREEN 100 (produced by Oji paper Co., Ltd.); AURORA COAT, SHIRAOI MATT, IMPERIAL MATT, SILVER DIAMOND, RECYCLE COAT 100 and CYCLE MATT 100 (produced by Nippon Paper Group, Inc.); μ COAT, μ WHITE, μ MATT and WHITE μ MATT (produced by Hokuetsu Paper Mills, Ltd.); RAICHO COAT N, REGINA RAICHO COAT 100, RAICHO MATT COAT N and REGINA RAICHO MATT 100 (produced by Chuetsu Pulp & Paper Co., Ltd.); and PEARL COAT, WHITE PEARL COAT N, NEW V MATT, WHITE NEW V MATT, PEARL COAT REW, WHITE PEARL COAT NREW, NEW V MATT REW and WHITE NEW V MATT REW (produced by Mitsubishi Paper Mills Limited).

Examples thereof as A3 coated (light coated) paper include OK COAT L, ROYAL COAT L, OK COAT LR, OK WHITE L, OK ROYAL COAT LR, OK COAT L GREEN 100 and OK MATT COAT L GREEN 100 (produced by Oji paper Co., Ltd.); EASTER DX, RECYCLE COAT L100, AURORA L, RECYCLE MATT L100 and <SSS> ENERGY WHITE (produced by Nippon Paper Group, Inc.); UTRILLO COAT L and MATISSE COAT (produced by Daio Paper Corporation); HIGH-ALPHA, ALPHA MATT, (N) KINMARI L and KINMARI HiL (produced by Hokuetsu Paper Mills, Ltd.); N PEARL COAT L, N PEARL COAT LREW and SWING MATT REW (produced by Mitsubishi Paper Mills Limited); and SUPER EMINE, EMINE and SHATON (produced by Chuetsu Pulp & Paper Co., Ltd.).

Examples thereof as B2 coated (medium-quality coated) paper include OK MEDIUM-QUALITY COAT, (F) MCOP, OK ASTRO GLOSS, OK ASTRO DULL and OK ASTRO MATT (produced by Oji paper Co., Ltd.); and KING O (produced by Nippon Paper Group, Inc.).

Examples thereof as finely coated paper include OK ROYAL LIGHT S GREEN 100, OK EVER LIGHT COAT, OK EVER LIGHT R, OK EVER GREEN, CLEAN HIT MG, OK FINE COATING SUPER ECO G, ECO GREEN DULL, OK FINE COATING MATT ECO G100, OK STAR LIGHT COAT, OK SOFT ROYAL, OK BRIGHT, CLEAN HIT G, YAMAYURI BRIGHT, YAMAYURI BRIGHT G, OK AQUA-LIGHT COAT, OK ROYAL LIGHT S GREEN 100, OK BRIGHT (Rough And Glossy), SNOW MATT, SNOW MATT DX, OK KASAHIME and OK KASAYURI (produced by Oji paper Co., Ltd.); PYRENE DX, PEGASUS HYPER 8, AURORA S, ANDES DX, SUPER ANDES DX, SPACE DX, SEINE DX, SPECIAL GRAVURE DX, PEGASUS, SILVER PEGASUS, PEGASUS HARMONY, GREENLAND DX100, SUPER GREENLAND DX100, <SSS> ENERGY SOFT, <SSS> ENERGY LIGHT and EE HENRY (produced by Nippon Paper Group, Inc.); KANT EXCEL, EXCEL SUPER B, EXCEL SUPER C, KANT EXCEL BARU, UTRILLO EXCEL, HEINE EXCEL and DANTE EXCEL (produced by Daio Paper Corporation); COSMO ACE (produced by Nippon Daishowa Paperboard Co., Ltd.); SEMI-UPPER L, HIGH BETA, HIGH GAMMA, SHIROMARI L, HUMMING, WHITE HUMMING, SEMI-UPPER HIL and SHIROMARI HIL (produced by Hokuetsu Paper Mills, Ltd.); RUBY LIGHT HREW, PEARL SOFT and RUBY LIGHT H (produced by Mitsubishi Paper Mills Limited); Shaton, Ariso and Smash (produced by Chuetsu Pulp & Paper Co., Ltd.); and Star Chemy and Chemy Super (produced by Marusumi Paper Co., Ltd.).

As seen in many documents, a coat layer of ordinary commercial printing paper is formulated so as to contain a binder (resin, emulsion, starch, etc.) by approximately 10 parts by mass to 15 parts by mass per 100 parts by mass of an inorganic pigment (kaolin, calcium carbonate, etc.). Here, when the manner in which the pigment is present in the coat layer, and further, the concentration gradient of the pigment in the coat layer are taken into consideration, the following can be regarded as possible: (1) formation of a clear layer or the like on the outermost surface of a coating film, as often seen in the case of paint, etc.; (2) penetration of binder components into original paper, which may cause the upper and lower layers to have asymmetrical concentration distributions. As to (1), it has been found that matters related to (1) are scarcely discussed in documents (documents concerning the glossiness, etc. of coated paper) in the relevant field. It is inferred that since the ratio of resin to other components in the coat layer is lower than the ratio of resin to other components in ordinary paint or the like, and the amount of the resin in the coat layer is not large enough for the resin to be deposited on the surface, anything like a clear layer does not easily form.

In meetings aimed at exchanging technical opinions with experts engaged in producing commercial coated paper, many of them are found to have a technological concept that a binder should have a function of providing strength to such an extent that a layer can be prevented from peeling off at the time of printing or particles can be prevented from detaching at the time of cutting; also, perhaps the production of coated paper is liable to become troublesome, as the amount of resin increases; accordingly, in the case of this type of paper, some hope to add a binder as little as possible.

As to (2), it is actually said that as the resin in the coating solution penetrates into the original paper, there arises a phenomenon in which the proportion of the resin in a coating layer becomes lower (than the proportion of the resin in the coating solution) or a layer is formed at the interface between the coating layer and the original paper; however, an example of creation of a gradient in the layer itself has not yet been confirmed (even in documents). Nevertheless, formation of a resin-rich layer at the interface between the coating layer and the original paper is possible, in which case lower parts of the layer have higher resin concentrations.

Examples of the method for polishing the outermost layer of the coated paper include, but are not limited to, a method of polishing with the use of sandpaper or wrapping paper, a method of polishing with the use of a wire brush, a method of polishing with the use of a polishing roller or an endless polishing belt, and a method of polishing with the use of a sandblast.

In producing the coated paper, the polishing may be carried out by arbitrarily providing a polishing process immediately after drying, before or after calendering, or in a process subsequent to coating, such as a slit process or packing process; alternatively, a user may carry out the polishing before printing, using a polishing device. Also, the polishing device may be installed in a printer so as to perform polishing each time printing is conducted.

As to the polishing, the whole surface of paper may be polished, or only an area to be subjected to ink-jet printing may be selectively polished.

For instance, the following paper usage is possible: the above-mentioned ordinary printing paper is subjected to offset printing or gravure printing in advance, then only an area which requires ink-jet printing is polished, and the area is printed with images, letters/characters, etc.

According to this method, hybrid printing, which has conventionally been performed using paper suitable for both ink-jet printing and ordinary printing, can also be performed using the above-mentioned ordinary printing paper, and thus it becomes possible for ordinary printing and ink-jet printing to employ paper in common. Also, this method enables printing of an address, etc. by ink-jet printing, which has been deemed difficult to achieve in ordinary printing.

Additionally, the polishing device may be installed in a unit of the printer, or may be independently prepared as a separate unit.

Specially made coated paper can be substituted for the medium of the present invention, as long as it satisfies the requirements of the present invention. In particular, coated paper in which the air permeability of a coat layer itself is high can be used. Examples of the coated paper in which the air permeability of a coat layer is high include some coated paper for electronic photographs, and coated paper for gravure printing. Specific examples thereof include POD GLOSS COAT (produced by Oji paper Co., Ltd.), FL GRAVURE (produced by Nippon Paper Group, Inc.), and ACE (produced by Nippon Paper Group, Inc.). These products include coat layers having large numbers of pores, and so any of these products can be used as the medium including the barrier layer of the present invention.

The ink included in the ink media set of the present invention can be suitably used for printers equipped with ink-jet heads of any type, including the piezo type in which ink droplets are ejected by deforming a diaphragm that forms a wall surface of an ink flow path, with the use of a piezoelectric element as a pressure generating unit that pressurizes ink in the ink flow path, and thusly changing the volume of the ink flow path (refer to JP-A No. 02-51734); the thermal type in which bubbles are generated by heating ink in an ink flow path with the use of an exothermic resistive element (refer to JP-A No. 61-59911); and the electrostatic type in which ink droplets are ejected by placing a diaphragm and an electrode, which form a wall surface of an ink flow path, to face each other, then deforming the diaphragm by electrostatic force generated between the diaphragm and the electrode, and thusly changing the volume of the ink flow path (refer to JP-A No. 06-71882).

As described above, the recording medium in the ink media set is used in combination with the ink in the ink media set. The combination of the recording medium and the ink can be suitably used in various fields, notably in image recording apparatuses (printers) based upon ink-jet recording; for instance, the combination of the recording medium and the ink can be particularly suitably used for an ink cartridge, ink recorded matter, an ink-jet recording apparatus and an ink-jet recording method of the present invention described below.

(Ink Cartridge)

An ink cartridge of the present invention includes a container to house the ink included in the ink media set of the present invention, and further includes other members, etc. suitably selected in accordance with the necessity.

The container is not particularly limited, and the shape, structure, size, material and the like thereof may be suitably selected in accordance with the intended use. Suitable examples thereof include a container having an ink bag or the like formed of an aluminum laminated film, resin film, etc.

Next, the ink cartridge will be explained with reference to FIGS. 1 and 2. Here, FIG. 1 is a diagram showing one example of the ink cartridge of the present invention, and FIG. 2 is a diagram exemplarily showing the ink cartridge of FIG. 1 with the inclusion of a case (outer covering).

Figure 2:
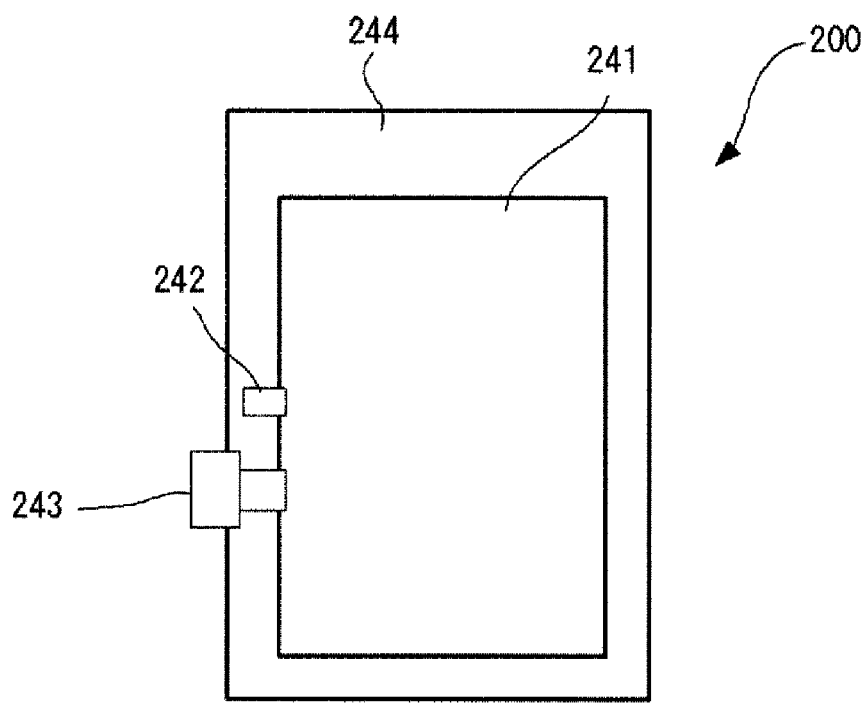
FIG. 2 is a schematic diagram exemplarily showing the ink cartridge of FIG. 1 with the inclusion of a case (outer covering).

In respect of an ink cartridge (200), as shown in FIG. 1, the ink of the present invention is supplied from an ink inlet (242) into an ink bag (241), and the ink inlet (242) is closed by means of fusion bonding after air is discharged. When the ink cartridge is used, an ink ejection outlet (243) made of a rubber material is pricked with a needle of an apparatus main body, and the ink is thus supplied to the apparatus.

The ink bag (241) is formed of an air-impermeable packing material such as an aluminum laminated film. As shown in FIG. 2, this ink bag (241) is normally housed in a plastic cartridge case (244) and detachably mounted on a variety of ink-jet recording apparatuses.

The ink cartridge of the present invention houses the ink included in the ink media set of the present invention and can be detachably mounted on a variety of ink-jet recording apparatuses. It is particularly desirable that the ink cartridge be detachably mounted on an ink-jet recording apparatus of the present invention described below.

(Ink-Jet Recording Method and Ink-Jet Recording Apparatus)

An ink-jet recording apparatus of the present invention includes at least an ink jetting unit, and further includes other units suitably selected in accordance with the necessity, such as a stimulus generating unit and a controlling unit.

An ink-jet recording method of the present invention includes at least an ink jetting step, and further includes other steps suitably selected in accordance with the necessity, such as a stimulus generating step and a controlling step.

The ink-jet recording method of the present invention can be suitably performed by the ink-jet recording apparatus of the present invention, and the ink jetting step can be suitably performed by the ink jetting unit. Also, the other steps can be suitably performed by the other units.

The ink jetting step is a step of jetting the ink included in the ink media set of the present invention so as to record an image on the recording medium included in the ink media set, by applying a stimulus to the ink.

The ink jetting unit is a unit configured to jet the ink included in the ink media set of the present invention so as to record an image on the recording medium included in the ink media set, by applying a stimulus to the ink. The ink jetting unit is not particularly limited, and examples thereof include nozzles for ejecting ink.

In the present invention, at least part of a liquid chamber, a fluid resistance unit, a diaphragm and a nozzle member of an ink-jet head is preferably formed of a material containing at least either silicone or nickel.

Also, the diameter of the ink-jet nozzle is preferably 30 μm or less, more preferably 1 μm to 20 μm.

Additionally, sub-tanks for supplying ink onto the ink-jet head are preferably provided such that the sub-tanks are replenished with ink from the ink cartridge via a supply tube.

Further, in the ink-jet recording method of the present invention, the maximum amount of the ink attached onto the recording medium is preferably 8 $g/m^2$ to 20 $g/m^2$ at a resolution of 300 dpi or higher.

The stimulus can, for example, be generated by the stimulus generating unit, and the stimulus is not particularly limited and may be suitably selected in accordance with the intended use. Examples thereof include heat, pressure, vibration and light. Each of these may be used alone or in combination with two or more. Among these, heat and pressure are suitable.

Examples of the stimulus generating unit include heaters, pressurizers, piezoelectric elements, vibration generators, ultrasonic oscillators and lights. Specific examples thereof include a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

The manner in which the ink included in the ink media set jets is not particularly limited and varies according to the type or the like of the stimulus. In the case where the stimulus is "heat", there is, for example, a method in which thermal energy corresponding to a recording signal is given to the ink in a recording head, using a thermal head or the like, bubbles are generated in the ink by the thermal energy, and the ink is ejected as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink flow path in a recording head, the piezoelectric element bends, the volume of the pressure chamber decreases, and thus the ink is ejected as droplets from nozzle holes of the recording head.

It is desirable that the ink droplets jetted be, for example, 1 pl to 40 pl in size, 5 m/s to 20 m/s in ejection velocity, 1 kHz or greater in drive frequency and 300 dpi or greater in resolution.

The controlling unit is not particularly limited and may be suitably selected in accordance with the intended use, as long as it can control operations of the aforementioned units. Examples thereof include apparatuses such as a sequencer and a computer.

One aspect of performing the ink-jet recording method of the present invention by the ink-jet recording apparatus of the present invention will be explained with reference to the drawings. The ink-jet recording apparatus in FIG. 3 includes an apparatus main body (101), a paper feed tray (102) for feeding paper that is loaded thereon into the apparatus main body (101), a paper discharge tray (103) for storing paper which has been loaded into the apparatus main body (101) and on which images have been recorded (formed), an ink cartridge loading section (104), an upper cover (111) which covers the upper surface side of the apparatus main body (101), and a front surface (112) which supports the upper cover (111), at the front side of the apparatus main body (101). An operation unit (105) composed of operation keys, a display and the like is placed on the upper surface of the ink cartridge loading section (104). The ink cartridge loading section (104) has a front cover (115) capable of opening and closing to attach and detach an ink cartridge (200).

Figure 4:
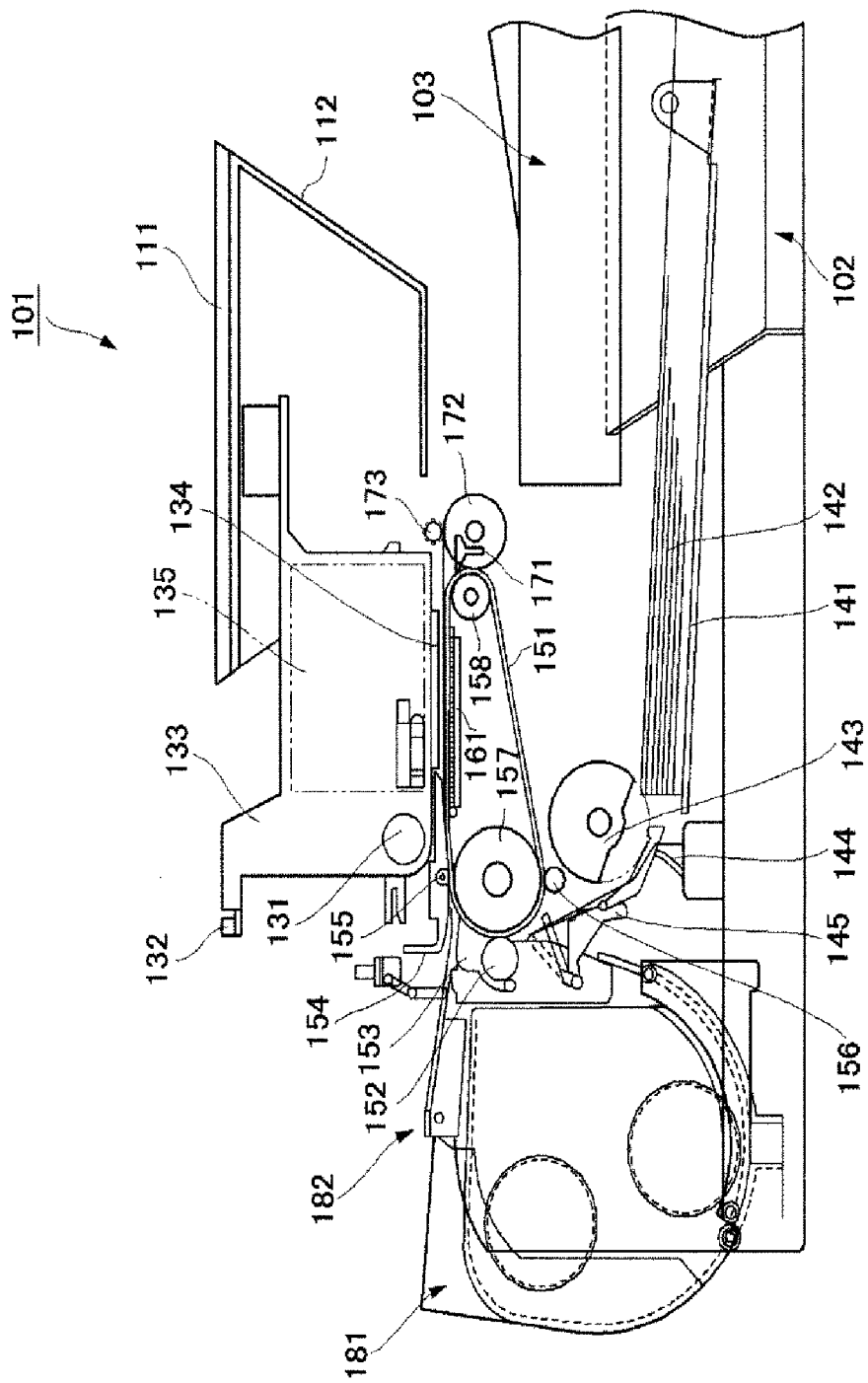
FIG. 4 is a schematic structural diagram for explaining the overall structure of an ink-jet recording apparatus of the present invention.
Figure 5:
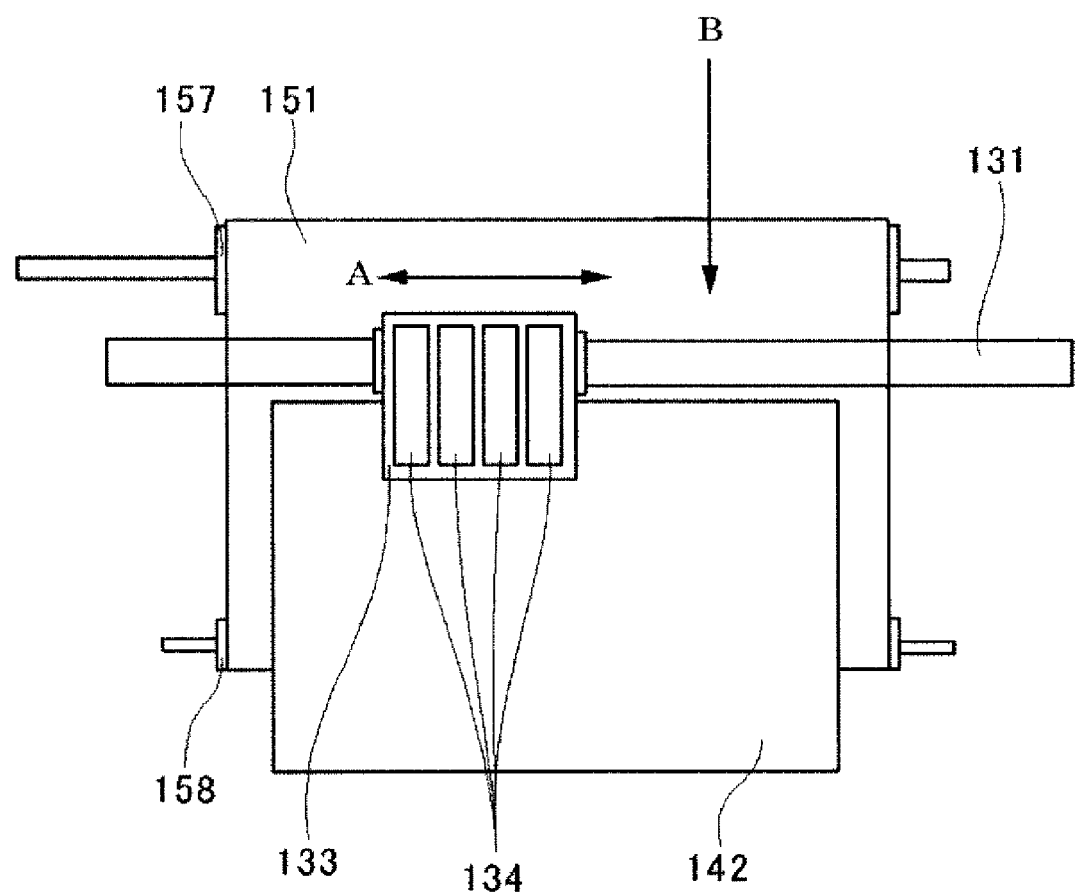
FIG. 5 is a schematic enlarged view showing one example of an ink-jet head of the present invention.

In the apparatus main body (101), as shown in FIGS. 4 and 5, a carriage (133) is freely slidably held in the main scanning direction by a guide rod (131), which is a guide member laterally passed between left and right side plates (not shown), and a stay (132); and the carriage (133) is moved for scanning in the direction indicated by the arrow A in FIG. 5 by a main scanning motor (not shown). The belt moves in the direction indicated by the arrow B in FIG. 5 to convey paper.

A recording head (134) composed of four ink-jet recording heads which eject ink droplets of yellow (Y), cyan (C), magenta (M) and black (Bk) is installed in the carriage (133) such that a plurality of ink ejection outlets are aligned in the direction intersecting the main scanning direction and that the ink droplet ejection direction faces downward.

For each of the ink-jet recording heads composing the recording head 134, it is possible to use, for example, a head provided with any of the following actuators as a energy-generating unit for ejecting ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

Also, the carriage (133) incorporates sub-tanks (135) of each color for supplying inks of each color to the recording head (134). Each sub-tank (135) is supplied and replenished with the ink included in the ink media set of the present invention from the ink cartridge (200) of the present invention loaded into the ink cartridge loading section (104), via an ink supply tube (not shown).

Meanwhile, as a paper feed unit for feeding sheets of paper (142) loaded on a paper loading section (pressure plate) (141) of the paper feed tray (102), there are provided a half-moon roller (paper feed roller (143)) which feeds the sheets of paper (142) one by one from the paper loading section (141), and a separation pad (144) which faces the paper feed roller (143) and is formed of a material with a large friction coefficient. This separation pad (144) is biased toward the paper feed roller (143) side.

As a conveyance unit for conveying the paper (142), which has been fed from this paper feed unit, under the recording head (134), there are provided a conveyance belt (151) for conveying the paper (142) by means of electrostatic adsorption; a counter roller (152) for conveying the paper (142), which is sent from the paper feed unit via a guide (145), such that the paper (142) is sandwiched between the counter roller (152) and the conveyance belt (151); a conveyance guide (153) for making the paper (142), which is sent upward in the substantially vertical direction, change its direction by approximately 90° and thusly correspond with the conveyance belt (151); and an end pressurizing roller (155) biased toward the conveyance belt (151) side by a pressing member (154). Also, there is provided a charging roller (156) as a charging unit for charging the surface of the conveyance belt (151).

The conveyance belt (151) is an endless belt and is capable of moving in circles in the belt conveyance direction, passed between a conveyance roller (157) and a tension roller (158). The conveyance belt (151) has, for example, a surface layer serving as a paper adsorbing surface, that is formed of a resinous material such as an ethylene-tetrafluoroethylene copolymer (ETFE) having a thickness of approximately 40 μm for which resistance control has not been conducted, and a back layer (intermediate resistance layer, ground layer) that is formed of the same material as this surface layer, for which resistance control has been conducted using carbon. On the back of the conveyance belt (151), a guide member (161) is placed correspondingly to a region where printing is carried out by the recording head (134). Additionally, as a paper discharge unit for discharging the paper (142) on which images or the like have been recorded by the recording head (134), there are provided a separation pawl (171) for separating the paper (142) from the conveyance belt (151), a paper discharge roller (172) and a paper discharge small roller (173), with the paper discharge tray (103) being placed below the paper discharge roller (172).

A double-sided paper feed unit (181) is mounted on a rear surface portion of the apparatus main body (101) in a freely detachable manner. The double-sided paper feed unit (181) takes in the paper (142) returned by rotation of the conveyance belt (151) in the opposite direction and reverses it, then refeeds it between the counter roller (152) and the conveyance belt (151). Additionally, a manual paper feed unit (182) is provided on an upper surface of the double-sided paper feed unit (181).

In this ink-jet recording apparatus, the sheets of paper (142) are fed one by one from the paper feed unit, and the paper (142) fed upward in the substantially vertical direction is guided by the guide (145) and conveyed between the conveyance belt (151) and the counter roller (152). Further, the conveyance direction of the paper (142) is changed by approximately 90°, as an end of the paper (142) is guided by the conveyance guide (153) and pressed onto the conveyance belt (151) by the end pressurizing roller (155).

On this occasion, the conveyance belt (151) is charged by the charging roller (156), and the paper (142) is electrostatically adsorbed onto the conveyance belt (151) and thusly conveyed. Here, by driving the recording head (134) according to an image signal while moving the carriage (133), ink droplets are ejected onto the paper (142) having stopped so as to carry out recording for one line, and after the paper (142) is conveyed by a predetermined distance, recording for the next line is carried out. On receipt of a recording completion signal or such a signal as indicates that the rear end of the paper (142) has reached the recording region, recording operation is finished, and the paper (142) is discharged onto the paper discharge tray (103).

Once the amount of ink remaining in the sub-tanks (135) has been detected as too small, a required amount of ink is supplied from the ink cartridge (200) into the sub-tanks (135).

As to this ink-jet recording apparatus, when ink in the ink cartridge (200) of the present invention has been used up, it is possible to replace only an ink bag inside the ink cartridge (200) by dismantling the housing of the ink cartridge (200). Also, even when the ink cartridge (200) is longitudinally placed and employs a front-loading structure, it is possible to supply ink stably. Therefore, even when the apparatus main body (101) is installed to with little space over it, for example when the apparatus main body (101) is stored in a rack or when an object is placed over the apparatus main body (101), it is possible to replace the ink cartridge (200) with ease.

It should be noted that although the ink-jet recording method of the present invention has been explained referring to an example in which it is applied to a serial-type (shuttle-type) ink-jet recording apparatus where a carriage performs scanning, the ink-jet recording method of the present invention can also be applied to line-type ink-jet recording apparatuses provided with line-type heads.

Also, the ink-jet recording apparatus and the ink-jet recording method of the present invention can be applied to a variety of types of recording based upon ink-jet recording systems. For example, they can be particularly suitably applied to ink-jet recording printers, facsimile apparatuses, copiers, printer/fax/copier complex machines, and so forth.

The following explains an ink-jet head to which the present invention is applied.

Figure 6:
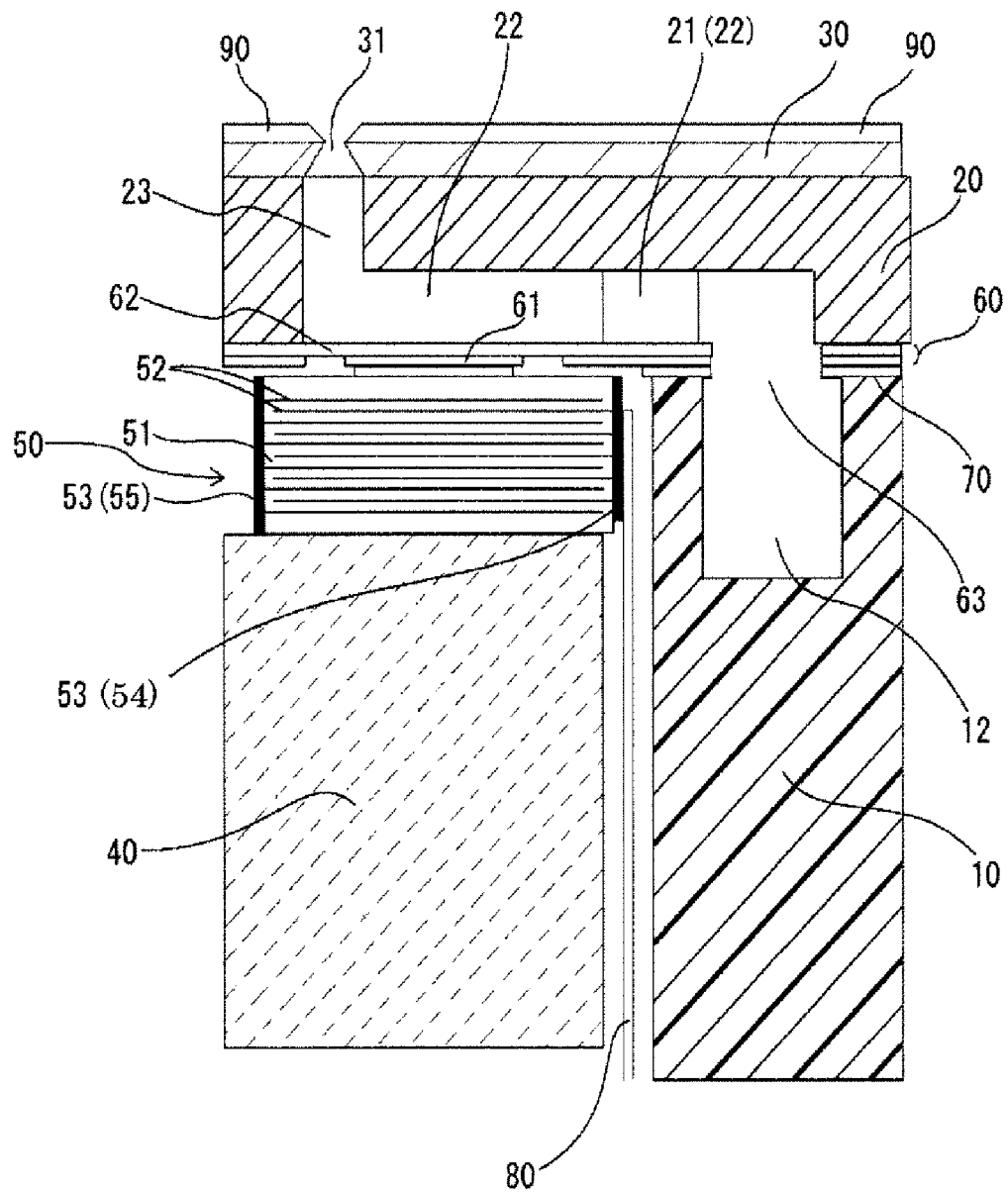
FIG. 6 is an enlarged view showing elements of one example of an ink-jet head of the present invention.
Figure 7:
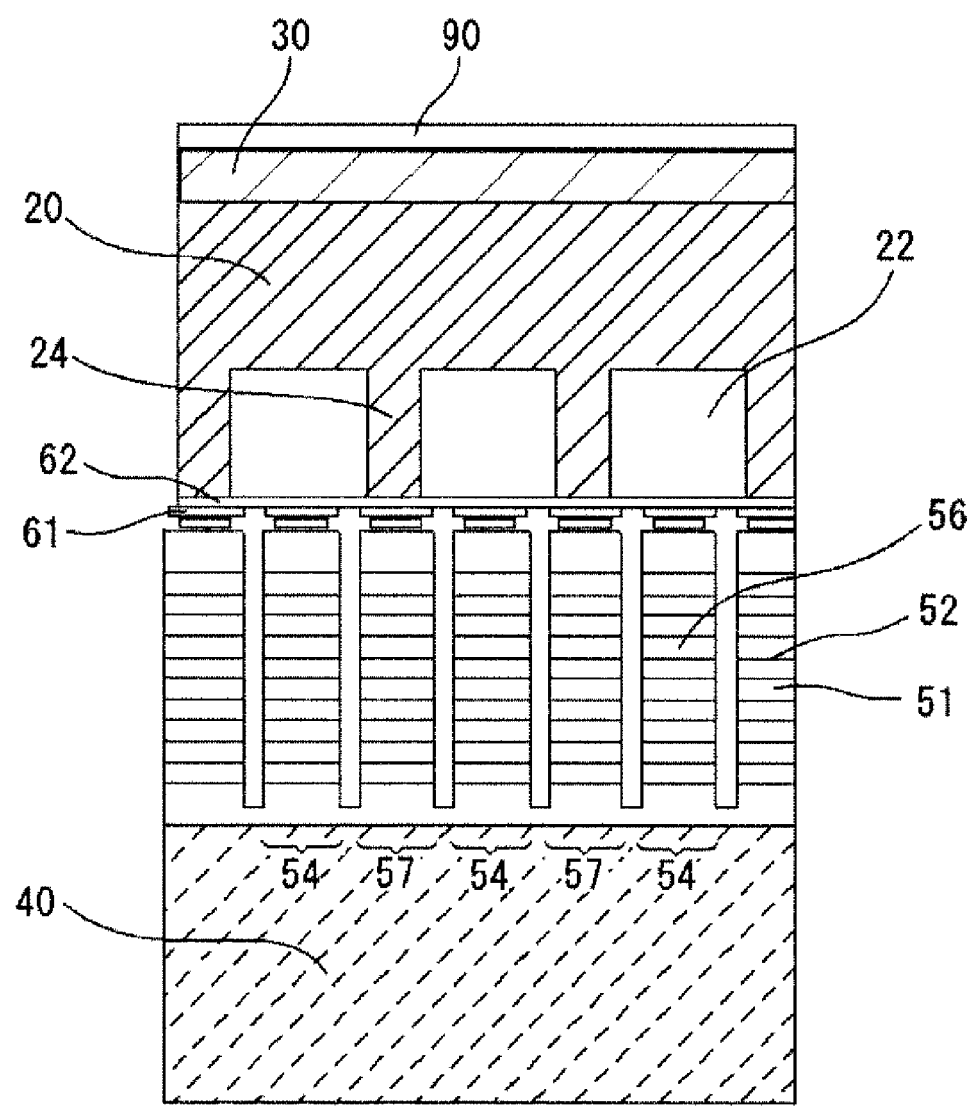
FIG. 7 is an enlarged cross-sectional view showing main parts of one example of an ink-jet head of the present invention.

FIG. 6 is an enlarged view showing elements of an ink-jet head to which the present invention has been applied, and FIG. 7 is an enlarged cross-sectional view showing main parts of the ink-jet head with respect to the channel-to-channel direction.

This ink-jet head is composed of a frame (10) provided with an ink supply port (not shown) (which supplies ink in the direction from the surface toward the back in FIG. 6 (toward the back surface of paper)) and an indentation serving as a common liquid chamber (12); a flow path plate (20) including a fluid resistance section (21), an indentation serving as a pressurized liquid chamber (22), and a communicating port (23) communicated with a nozzle (31); a nozzle plate (30) forming the nozzle (31); a diaphragm (60) provided with a diaphragm protrusion (61), a diaphragm part (62) and an ink flow-in port (63); a laminated piezoelectric element (50) joined to the diaphragm (60) with an adhesive layer (70) placed in between; and a base (40) on which the laminated piezoelectric element (50) is fixed. The base (40) is made of a barium titanate-based ceramic and joined to the laminated piezoelectric element (50) that is arranged in two rows.

In the laminated piezoelectric element (50), piezoelectric layers (51), which are formed of lead zirconate titanate (PZT) and each one of which is 10 μm to 50 μm in thickness, and internal electrode layers (52), which are formed of silver-palladium (AgPd) and each one of which is several micrometers in thickness, are alternately deposited on top of one another. The internal electrode layers (52) are connected to external electrodes (53), at their ends on both sides.

The laminated piezoelectric element (50) is formed into the shape of comb teeth by half-cut dicing, in which drive parts (movable parts) (56) and support parts (non-drive parts) (57) are alternately disposed (FIG. 7).

The length of the outer end of one of the two external electrodes (53) (which is contiguous to the ends of the internal electrode layers (52) on one side in the direction of the surface or the back in FIG. 6 (the back surface of paper)) is limited by cutting or the like so as to be divided by half-cut dicing, and divided pieces serve as individual electrodes (54). The other of the two external electrodes (53) is not divided by dicing but electrically continuous, serving as a common electrode (55).

An FPC (80) is welded to the individual electrodes (54) of the drive parts. With an electrode layer provided at an end of the laminated piezoelectric element, the common electrode (55) is joined to a Gnd electrode of the FPC (80) in a twisted manner. On the FPC (80), a driver IC (not shown) is mounted, which controls application of drive voltage to the drive parts (movable parts) (56).

The diaphragm (60) is equipped with the diaphragm part (62) formed as a thin film; the island-like convex portion (island part) (61) which is formed at the center of this diaphragm part (62) and joined to the drive parts (movable parts) (56) of the laminated piezoelectric element (50); a thick film portion including a beam joined to the support parts (not shown); and an opening serving as the ink flow-in port (63), formed by combining two Ni-plated films produced by electroforming. The diaphragm portion has a thickness of 3 μm and a width of 35 μm (with respect to one side).

By patterning the adhesive layer (70) including a gap material, the island-like diaphragm protrusion (61) of the diaphragm (60) is bonded to the drive parts (movable parts) (56) of the laminated piezoelectric element (50), and the diaphragm (60) is bonded to the frame (10).

As to the flow path plate (20), the following members are patterned by etching with the use of a silicon single-crystal substrate: the fluid resistance section (21); the indentation serving as the pressurized liquid chamber (22); and a through-hole serving as the communicating port (23), placed in a position corresponding to the nozzle (31).

The portions that remain unetched serve as partitions (24) of the pressurized liquid chamber (22). Additionally, this head is provided with a portion where the etching width is small to serve as the fluid resistance section (21).

A nozzle plate (30) is formed of a metal material, for example an Ni-plated film produced by electroforming, and a large number of nozzles (31), which are minute ejection outlets for jetting ink droplets, are formed therein. The internal shape (inner shape) of each of these nozzles (31) is similar to the shape of a horn (which may otherwise be a substantially columnar shape or a substantially conical and trapezoidal shape). Also, the diameter of each of these nozzles (31) is approximately 20 μm to 35 μm as a diameter on the side where ink droplets exit. Additionally, the nozzle pitch in each row is 150 dpi.

An ink ejection surface (on the nozzle surface side) of the nozzle plate (30) is provided with an ink-repellent layer (90) and a water-repellent layer (not shown) which has been subjected to water-repellent surface treatment. High image quality is obtained through stabilization of the droplet shape and jetting properties of ink by providing a water-repellent film selected in accordance with the ink properties, which is produced by PTFE-Ni eutectoid plating, electrodeposition of a fluorine resin, vapor deposition coating of an evaporable fluorine resin (such as a fluorinated pitch), baking of a silicone resin and a fluorine resin after application of solvent, etc. For instance, as to the fluorine resin among these, although a variety of materials are known as fluorine resins, superior water repellency can be obtained by subjecting a modified perfluoropolyoxetane (product name: OPTOOL DSX, produced by Daikin Industries, Ltd.) to vapor deposition so as to have a thickness of 30 Å to 100 Å.

The frame (10) including the ink supply port and the indentation serving as the common liquid chamber (12) is produced by molding a resin.

As to the ink-jet head with such a structure, by applying a drive waveform (a pulse voltage of 10V to 50V) to the drive parts (movable parts) (56) correspondingly to a recording signal, displacement of the lamination direction is generated in the drive parts (movable parts) (56), there is an increase in pressure as the pressurized liquid chamber (22) is pressurized, and thus ink droplets are ejected from the nozzle (31) formed in the nozzle plate (30).

Thereafter, once ejection of ink droplets is over, the ink pressure in the pressurized liquid chamber (22) lowers, and negative pressure is generated in the pressurized liquid chamber (22) due to inertia of the flow of ink and a drive pulse discharge process, which is followed by an ink supply step. On this occasion, the ink supplied from an ink tank flows into the common liquid chamber (12), passes from the common liquid chamber (12) through the fluid resistance section (21) via the ink flow-in port (63) and then is supplied into the pressurized liquid chamber (22).

The fluid resistance section (21) is effective in reducing residual pressure vibrations after ink ejection; conversely, it serves as a resistance to refilling effected by surface tension. By suitably selecting the fluid resistance section, it becomes possible to balance reduction in residual pressure and refill time and to shorten the time spent in shifting to an ink droplet ejecting operation that follows (the driving cycle).

EXAMPLES

The following explains Examples of the present invention; however, it should be noted that the present invention is not confined to these Examples in any way.

Preparation Example 1

Surface-Treated Carbon Black Pigment (P1) Dispersion Solution

Into 3,000 mL of 2.5N sodium sulfate solution, 90 g of carbon black having a CTAB specific surface area of 150 m$^2$/g and a DBP oil absorption of 100 mL/100 g was added, then the mixture was stirred at a temperature of 60° C. and a rotational speed of 300 rpm and subjected to reaction for 10 hr, and the carbon black was thus oxidized. This reaction solution was filtered, then the carbon black which had been filtered out was neutralized with a sodium hydroxide solution and subjected to ultrafiltration.

The carbon black obtained was washed with water and dried, then dispersed into purified water such that its amount was 20% by mass.

Preparation Example 2

Surface-Treated Yellow Pigment (P1) Dispersion Solution

As a yellow pigment, a pigment (P1) was produced by plasma-treating C. I. Pigment Yellow 128 at a low temperature and introducing a carboxylic acid group. This pigment (P1) was dispersed into ion-exchange water, then the solution was demineralized and condensed using an ultrafiltration membrane, and a yellow pigment dispersion solution having a pigment concentration of 15% was thus obtained.

Preparation Example 3

Surface-Treated Magenta Pigment (P1) Dispersion Solution)

A surface-modified magenta pigment (P1) was prepared in accordance with the procedure of Preparation Example 2, using Pigment Red 122 instead of C. I. Pigment Yellow 128. As in the above-mentioned example, a surface-modified coloring pigment (P1) obtained was easily dispersed in an aqueous medium when stirred, then the solution was demineralized and condensed using an ultrafiltration membrane, and a magenta pigment (P1) dispersion solution having a pigment concentration of 15% was thus obtained.

Preparation Example 4

Surface-Treated Cyan Pigment (P1) Dispersion Solution

A surface-modified cyan pigment (P1) was prepared in accordance with the procedure of Preparation Example 2, using C. I. Pigment Cyan 15:3 instead of C. I. Pigment Yellow 128. As in the above-mentioned example, a surface-modified coloring pigment (P1) obtained was easily dispersed in an aqueous medium when stirred, then the solution was demineralized and condensed using an ultrafiltration membrane, and a cyan pigment (P1) dispersion solution having a pigment concentration of 15% was thus obtained.

Synthesis Example 1

Preparation of Polymer Dispersion Solution

The atmosphere inside a 1 L flask equipped with a mechanical stirrer, a thermometer, a nitrogen gas introducing pipe, a reflux condenser and a dripping funnel was adequately replaced by nitrogen gas, then 11.2 g of styrene, 2.8 g of acrylic acid, 12.0 g of lauryl methacrylate, 4.0 g of polyethylene glycol methacrylate, 4.0 g of a styrene macromer (product name: AS-6 produced by Toagosei Co., Ltd.) and 0.4 g of mercaptoethanol were placed, and the temperature was raised to 65° C. Next, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer (product name: AS-6 produced by Toagosei Co., Ltd.), 3.6 g of mercaptoethanol, 2.4 g of azobisdimethylvaleronitrile and 18 g of methyl ethyl ketone was poured dropwise into the flask in 2.5 hr. After the dropping of the mixed solution had finished, a mixed solution of 0.8 g of azobisdimethylvaleronitrile and 18 g of methyl ethyl ketone was applied dropwise into the flask in 0.5 hr. The ingredients were aged at 65° C. for 1 hr, then 0.8 g of azobismethylvaleronitrile was added, and further, the ingredients were aged for 1 hr. After reaction had finished, 364 g to of methyl ethyl ketone was added into the flask, and 800 g of a polymer solution having a solid content concentration of 50% by mass was thus obtained.

Preparation Example 5

Preparation of Fine Polymer Particle Dispersion Containing Phthalocyanine Pigment (P1)

After sufficiently stirring 28 g of the polymer solution produced in Synthesis Example 1, 26 g of a phthalocyanine pigment (P1), 13.6 g of 1 mol/L potassium hydroxide solution, 20 g of methyl ethyl ketone and 30 g of ion-exchange water, the ingredients were kneaded using a three-roll mill. The paste obtained was put into 200 g of ion-exchange water, and the solution was sufficiently stirred; thereafter, the methyl ethyl ketone and the water were removed by distillation using an evaporator, and a cyan fine polymer particle dispersion was thus obtained.

Preparation Example 6

Preparation of Fine Polymer Particle Dispersion Containing Dimethyl Quinacridone Pigment (P1)

A magenta fine polymer particle dispersion was obtained in a manner similar to Preparation Example 5, except that the phthalocyanine pigment (P1) was changed to Pigment Red 122.

Preparation Example 7

Preparation of Fine Polymer Particle Dispersion Containing Monoazo Yellow Pigment (P1)

A yellow fine polymer particle dispersion was obtained in a manner similar to Preparation Example 5, except that the phthalocyanine pigment (P1) was changed to Pigment Yellow 74.

Preparation Example 8

Preparation of Fine Polymer Particle Dispersion Containing Carbon Black Pigment (P1)

A black fine polymer particle dispersion was obtained in a manner similar to Preparation Example 5, except that the phthalocyanine pigment (P1) was changed to carbon black.

Preparation Example 9

Preparation of Phthalocyanine Pigment (P1) Dispersion

A mixture was prepared by mixing 150 g of C. I. Pigment Cyan 15:3, 110 g of a polyoxyethylene β-naphthyl ether as a pigment dispersant represented by Structural Formula (2) shown below (R: alkyl group, m=4, n=40), 2 g of Pionin A-51-B (produced by Takemoto Oil & Fat Co., Ltd.) and 738 g of distilled water, then this mixture was predispersed and subsequently dispersed in a circulated manner for 20 hr using a disc-type bead mill (Model KDL, manufactured by Shinmaru Enterprises Corporation; media: 0.3 mmφ zirconia balls), and a phthalocyanine pigment (P1) dispersion was thus obtained.

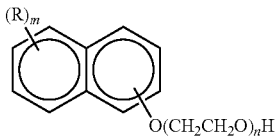

Structural Formula (2)

(In Structural Formula (2), R denotes an alkyl group having 1 to 20 carbon atoms, m denotes an integer of 0 to 7, and n denotes an integer of 20 to 200.)

Preparation Example 10

Preparation of Dimethyl Quinacridone Pigment (P1) Dispersion

A dimethyl quinacridone pigment (P1) dispersion was obtained in a manner similar to Preparation Example 9, except that the C. I. Pigment Cyan 15:3 was changed to C. I. Pigment Red 122.

Preparation Example 11

Preparation of Monoazo Yellow Pigment (P1) Dispersion

A monoazo yellow pigment (P1) dispersion was obtained in a manner similar to Preparation Example 9, except that the C. I. Pigment Cyan 15:3 was changed to C. I. Pigment Yellow 74.

The following shows a synthesis example of an acrylic-silicone resin emulsion among components able to be contained in the water-dispersible resin (A) used in the present invention.

Synthesis Example 2

Synthesis 1 of Silicone-Modified Acrylic Resin Fine Particles not Containing Reactive Silyl Group The atmosphere inside a flask equipped with a mechanical stirrer, a thermometer, a nitrogen gas introducing pipe, a reflux condenser and a dripping funnel was adequately replaced by nitrogen gas, then 10 g of AQUALON RN-20 (produced by Dai-Ichi Kogyo Seiyaku Co., Ltd.), 1 g of potassium persulfate and 286 g of purified water were placed, and the temperature was raised to 65° C. Next, a mixed solution containing 150 g of methyl methacrylate, 100 g of 2-ethylhexyl acrylate, 20 g of acrylic acid, 20 g of vinyltriethoxysilane, 10 g of AQUALON RN-20 (produced by Dai-Ichi Kogyo Seiyaku Co., Ltd.), 4 g of potassium persulfate and 398.3 g of purified water was poured dropwise into the flask in 2.5 hr. The ingredients were heated and aged at 80° C. for 3 hr then cooled, and the pH was adjusted to 7 to 8, using potassium hydroxide. Finally, ethanol which had been formed in the reaction process was evaporated. The particle diameter of the resin, measured using MICROTRACK UPA, was 130 nm. The minimum film forming temperature (MFT) was 0° C.

Synthesis Example 3

Synthesis 2 of Silicone-Modified Acrylic Resin Fine Particles not Containing Reactive Silyl Group The atmosphere inside a flask equipped with a mechanical stirrer, a thermometer, a nitrogen gas introducing pipe, a reflux condenser and a dripping funnel was adequately replaced by nitrogen gas, then 10 g of AQUALON RN-20 (produced by Dai-Ichi Kogyo Seiyaku Co., Ltd.), 1 g of potassium persulfate and 286 g of purified water were placed, and the temperature was raised to 65° C. Next, a mixed solution containing 150 g of methyl methacrylate, 100 g of 2-ethylhexyl acrylate, 20 g of acrylic acid, 40 g of hexyltrimethoxysilane, 10 g of AQUALON RN-20 (produced by Dai-Ichi Kogyo Seiyaku Co., Ltd.), 4 g of potassium persulfate and 398.3 g of purified water was poured dropwise into the flask in 3 hr. The ingredients were heated and aged at 80° C. for 3 hr then cooled, and the pH was adjusted to 7 to 8, using potassium hydroxide. Finally, ethanol which had been formed in the reaction process was evaporated. The particle diameter of the resin, measured using MICROTRACK UPA, was 148 nm. The minimum film forming temperature (MFT) was 0° C.

Synthesis Example 4

Synthesis of Silicone-Modified Acrylic Resin Fine Particles Containing Reactive Silyl Group Silicone-modified acrylic resin fine particles containing a reactive silyl group were synthesized in accordance with Examples described in JP-A 06-157861.

The atmosphere inside a flask equipped with a mechanical stirrer, a thermometer, a nitrogen gas introducing pipe, a reflux condenser and a dripping funnel was adequately replaced by nitrogen gas, then 100 g of purified water, 3 g of sodium dodecylbenzenesulfonate and 1 g of polyethylene glycol nonylphenyl ether were placed, with the addition of 1 g of ammonium persulfate and 0.2 g of sodium hydrogen sulfite, and the temperature was raised to 60° C. Next, 30 g of butyl acrylate, 40 g of methyl methacrylate, 19 g of butyl methacrylate, 10 g of vinylsilanetriol potassium salt and 1 g of 3-methacryloxypropylmethyldimethoxysilane were poured dropwise into the flask in 3 hr. On this occasion, the solution for polymerization reaction was polymerized, as its pH was adjusted to 7 using ammonia aqueous solution. The particle diameter of the resin, measured using MICROTRACK UPA, was 160 nm.

The following explains Examples and Comparative Examples of the present invention; however, it should be noted that the present invention is not confined to these Examples and Comparative Examples. It should also be noted that the amounts of components mentioned in Examples are based upon mass.

Ink compositions according to the following formulations were prepared, and they were each mixed into a lithium hydroxide 10% aqueous solution such that their pH values became 9. Thereafter, the solutions were filtered using a membrane filter of 0.8 μm in average pore diameter, and ink compositions were thus obtained.

The following explains the present invention more specifically by means of Ink Production Examples; however, it should be noted that the present invention is not confined to these Ink Production Examples. It should also be noted that the amounts (%) of components mentioned below are based upon mass.

Ink Production Example 1

Black Ink 1

| | |
|---|---|
| The carbon black produced in Preparation Example 1 | 9% (as a solid content) |
| 3-methyl-1,3-butanediol | 20% |
| Glycerin | 15% |
| 2-pyrrolidone | 2% |
| The compound represented by Structural Formula (1) shown below ($R_1$: $CF_3$, Rf: $CF_3$, x = 2, y = 2, z = 10) | 1% |
| 2-ethyl-1,3-hexanediol | 2% |
| A total of 100% was made by addition of ion-exchange water. | |

Structural Formula (1)

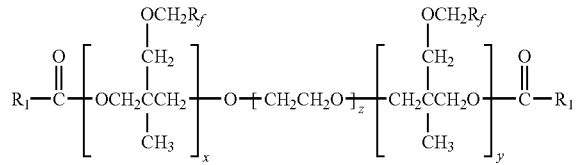

(In Structural Formula (1), $R_1$ denotes any one of a hydrogen atom, an alkyl group and a fluorine-containing group, Rf denotes a fluorine-containing group, and each of x, y and z denotes an integer of 1 or greater.)

Ink Production Example 2

Yellow Ink 1

| | |
|---|---|
| The yellow pigment (P1) dispersion solution produced in Preparation Example 2 | 6% (as a solid content) |
| 1,3-butanediol | 20% |
| Glycerin | 20% |
| 2-pyrrolidone | 1% |
| The compound represented by Structural Formula (1) shown above ($R_1$: $CF_3$, Rf: $C_2F_5$, x = 2, y = 2, z = 10) | 1% |
| 2,2,4-trimethyl-1,3-pentanediol | 2% |
| A total of 100% was made by addition of ion-exchange water. | |

Ink Production Example 3

Magenta Ink 1

| | |
|---|---|
| The magenta pigment (P1) dispersion solution produced in Preparation Example 3 | 8% (as a solid content) |
| Triethylene glycol isobutyl ether | 2% |
| Glycerin | 20% |
| The compound represented by Structural Formula (1) shown above ($R_1$: $CF_3$, Rf: $C_2F_5$, x = 2, y = 2, z = 10) | 1% |
| 2-ethyl-1,3-hexanediol | 2% |
| A total of 100% was made by addition of ion-exchange water. | |

Ink Production Example 4

Cyan Ink 1

| | |
|---|---|
| The cyan pigment (P1) dispersion solution produced in Preparation Example 4 | 6% (as a solid content) |
| 3-methyl-1,3-butanediol | 15% |
| Glycerin | 15% |
| The compound represented by Structural Formula (1) shown above ($R_1$: H, Rf: $C_2F_5$, x = 2, y = 2, z = 10) | 1% |
| 2-ethyl-1,3-hexanediol | 2% |
| A total of 100% was made by addition of ion-exchange water. | |

Ink Production Example 5

Cyan Ink 2

| | |
|---|---|
| The cyan pigment (P1) dispersion solution produced in Preparation Example 5 | 5% (as a solid content) |
| 1,6-hexanediol | 20% |
| Glycerin | 15% |
| The compound represented by Structural Formula (1) shown above ($R_1$: $CF_3$, Rf: $C_2F_5$, x = 4, y = 4, z = 20) | 1.5% |
| FS-300 (produced by E. I. du Pont de Nemours and Company) | 0.3% |
| 2-ethyl-1,3-hexanediol | 2% |
| A total of 100% was made by addition of ion-exchange water. | |

Ink Production Example 6

Magenta Ink 2

| | |
|---|---|
| The magenta pigment (P1) dispersion solution produced in Preparation Example 6 | 7.5% (as a solid content) |
| Dipropylene glycol | 15% |
| Glycerin | 20% |
| The compound represented by Structural Formula (1) shown above ($R_1$: $CF_3$, Rf: $C_2F_5$, x = 4, y = 4, z = 20) | 0.5% |
| FSN-100 (produced by E. I. du Pont de Nemours and Company) | 0.5% |
| 2-ethyl-1,3-hexanediol | 2% |
| A total of 100% was made by addition of ion-exchange water. | |

Ink Production Example 7

Yellow Ink 2

| | |
|---|---|
| The yellow pigment (P1) dispersion solution produced in Preparation Example 7 | 5% (as a solid content) |
| 2-methyl-2,4-pentanediol | 10% |
| Glycerin | 20% |
| The compound represented by Structural Formula (1) shown above ($R_1$: $CF_3$, Rf: $C_2F_5$, x = 4, y = 4, z = 20) | 1.5% |
| 2,2,4-trimethyl-1,3-pentanediol | 1% |

A total of 100% was made by addition of ion-exchange water.

Ink Production Example 8

Black Ink 2

| | |
|---|---|
| The black pigment (P1) dispersion solution produced in Preparation Example 8 | 8% (as a solid content) |
| 1,6-hexanediol | 20% |
| Glycerin | 12% |
| The compound represented by Structural Formula (1) shown above ($R_1$: H, Rf: $C_2F_5$, x = 4, y = 4, z = 20) | 1.5% |
| 2-ethyl-1,3-hexanediol | 2.5% |

A total of 100% was made by addition of ion-exchange water.

Comparative Production Example 1

Comparative Pigment (P1) Black Ink 1

A black ink was obtained in a manner similar to Ink Production Example 1, except that ECTD-3NEX (an anionic surfactant, produced by Nikko Chemicals Co., Ltd.) was used instead of the compound represented by Structural Formula (1) shown above ($R_1$: $CF_3$, Rf: $CF_3$, x=2, y=2, z=10).

Comparative Production Example 2

Comparative Pigment Yellow Ink 1

A yellow ink was obtained in a manner similar to Ink Production Example 2, except that ECTD-6NEX (an anionic surfactant, produced by Nikko Chemicals Co., Ltd.) was used instead of the compound represented by Structural Formula (1) shown above ($R_1$: $CF_3$, Rf: $C_2F_5$, x=2, y=2, z=10).

Ink Production Example 9

Magenta Ink 3

A magenta ink was obtained in a manner similar to Ink Production Example 3, except that DISPANOL TOC (a nonionic surfactant, produced by Nippon Oil & Fats Co., Ltd.) was used instead of the compound represented by Structural Formula (1) shown above ($R_1$: $CF_3$, Rf: $C_2F_5$, x=2, y=2, z=10).

Ink Production Example 10

Cyan Ink 3

A cyan ink was obtained in a manner similar to Ink Production Example 4, except that DISPANOL TOC (a nonionic surfactant, produced by Nippon Oil & Fats Co., Ltd.) was used instead of the compound represented by Structural Formula (1) shown above ($R_1$: H, Rf: $C_2F_5$, x=2, y=2, z=10).

The following explains the ink compositions, as the inks of Ink Production Examples and Comparative Production Examples of the present invention are shown in Table 1.

The surface tension and viscosity of each ink are shown in Table 1.

The surface tension of each ink was measured using CBVP-Z manufactured by Kyowa Interface Science Co., Ltd. The viscosity of each ink was measured using the R-type viscometer RC-500 manufactured by TOKI SANGYO CO., LTD.

TABLE 1

| Ink Production Example | Ink | Surface tension (mN/m) | Viscocity (mPa·s) |
|---|---|---|---|
| Ink Production Example 1 | Black ink 1 | 26.9 | 8.85 |
| Ink Production Example 2 | Yellow ink 1 | 26.7 | 9.04 |
| Ink Production Example 3 | Magenta ink 1 | 25.8 | 9.13 |
| Ink Production Example 4 | Cyan ink 1 | 25.7 | 7.34 |
| Ink Production Example 5 | Cyan ink 2 | 25.1 | 8.12 |
| Ink Production Example 6 | Magenta ink 2 | 26.8 | 8.65 |
| Ink Production Example 7 | Yellow ink 2 | 26.2 | 9.07 |
| Ink Production Example 8 | Black ink 2 | 26.3 | 8.02 |
| Comparative Production Example 1 | Comparative pigment black ink 1 | 32.2 | 8.99 |
| Comparative Production Example 2 | Comparative pigment yellow ink 1 | 32.7 | 9.21 |
| Ink Production Example 9 | Magenta ink 3 | 31.1 | 9.26 |
| Ink Production Example 10 | Cyan ink 3 | 31.3 | 7.51 |

Next, ink sets of Examples 1 and 2 and Comparative Example 1 are shown in Table 2.

TABLE 2

| | Ink set | Black ink | Cyan ink | Magenta ink | Yellow ink |
|---|---|---|---|---|---|
| Example 1 | Ink set 1 | Production Example 1 | Production Example 4 | Production Example 3 | Production Example 2 |
| Example 2 | Ink set 2 | Production Example 8 | Production Example 5 | Production Example 6 | Production Example 7 |
| Comparative Example 1 | Comparative set 1 | Comparative Production Example 1 | Production Example 10 | Production Example 9 | Comparative Production Example 2 |

(Printer Used for Printing)

Figure 3:
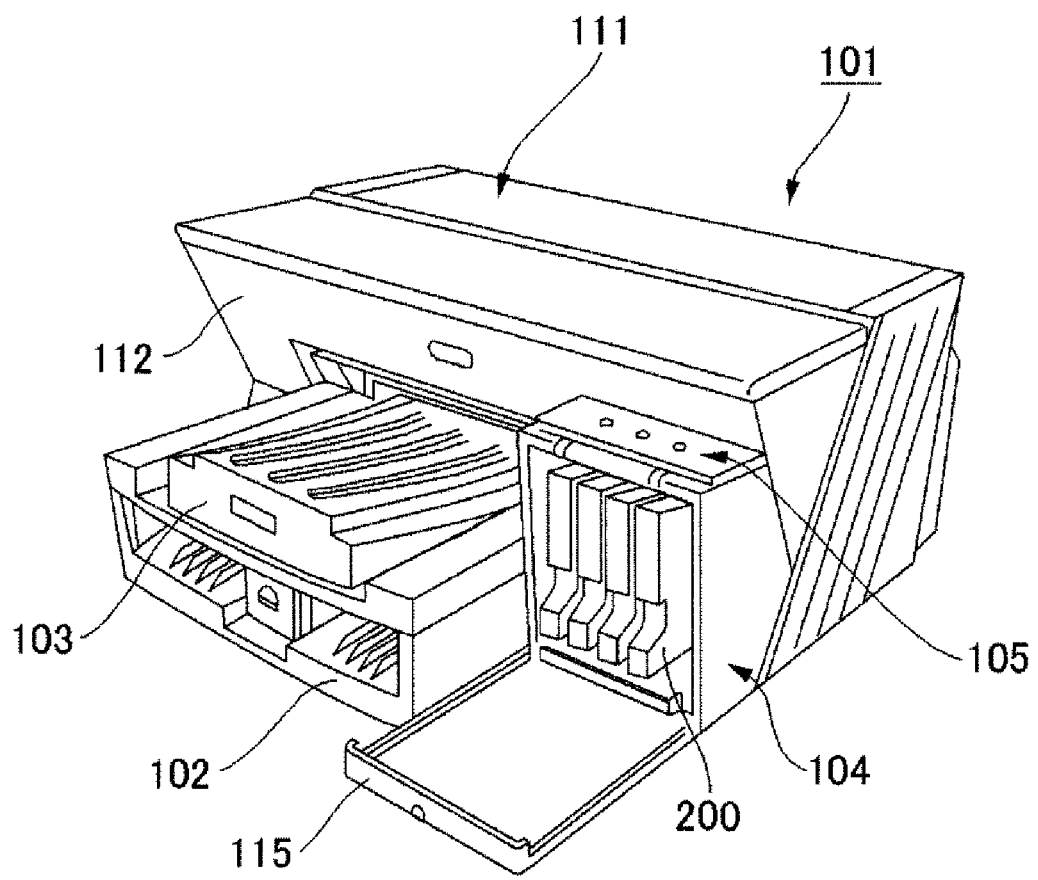
FIG. 3 is an explanatory perspective view exemplarily showing an ink-jet recording apparatus of the present invention when a cover provided at an ink cartridge loading section is open.

Printing was carried out on sheets of the following plain paper, using the printer in FIGS. 3 and 4 explained in detail in the present invention.

(Paper Used for Printing)

As paper for the printing test, MY PAPER (produced by NBS Ricoh Co., Ltd.) was used.

As to a printing pattern, printing was carried out using the inks of black, yellow, magenta and cyan of the present invention at a duty of 100%.

As to printing conditions, the recording density was 300 dpi, and one-pass printing was employed.

After printed images had been dried, the images were holistically examined for bleeding on boundaries between each two colors combined together, image bleeding and image density by visual observation and by a reflective color spectrophotometric colorimetry densitometer (manufactured by X-Rite, Inc.), and the images were judged in accordance with the following evaluation criteria.

(1) Clarity of Image (Feathering and Color Bleeding) Evaluation Criteria

A: all sheets of paper exhibited clear printing without bleeding

B: bleeding in the form of beards was seen on some sheets of paper (recycled paper)

C: bleeding in the form of beards was seen on all sheets of paper

D: bleeding arose to such an extent that outlines of letters/characters were unclear (2) Image Density The optical densities of solid image portions of each color after printing were measured using X-RITE 932. The evaluation results are shown in Table 3.

TABLE 3

| | | Feathering | Color bleeding | Image density |
|---|---|---|---|---|
| Example 1 | Production Example 1 | A | A | 1.36 |
| | Production Example 2 | A | A | 0.88 |
| | Production Example 3 | A | A | 1.00 |
| | Production Example 4 | A | A | 1.07 |
| Example 2 | Production Example 5 | A | A | 1.10 |
| | Production Example 6 | A | A | 1.04 |
| | Production Example 7 | A | A | 0.89 |
| | Production Example 8 | A | A | 1.34 |
| Comparative Example 1 | Comparative Production Example 1 | C | C | 1.20 |
| | Comparative Production Example 2 | C | C | 0.69 |
| | Production Example 9 | B | B | 0.81 |
| | Production Example 10 | B | B | 0.96 |

Ink Production Example 11

Black Ink 3

| | |
|---|---|
| The carbon black produced in Preparation Example 1 | 8% (as a solid content) |
| The acrylic-silicone resin emulsion of Synthesis Example 2 | 4% (as a solid content) |
| 3-methyl-1,3-butanediol | 8% |
| Glycerin | 10% |
| 2-pyrrolidone | 2% |
| The compound represented by Structural Formula (1) shown above ($R_1$: $CF_3$, Rf: $C_2F_5$, x = 4, y = 4, z = 20) | 0.5% |
| 2,2,4-trimethyl-1,3-pentanediol | 1.5% |

A total of 100% was made by addition of ion-exchange water.

Ink Production Example 12

Yellow Ink 3

| | |
|---|---|
| The yellow pigment dispersion solution produced in Preparation Example 2 | 5% (as a solid content) |
| The acrylic-silicone resin emulsion of Synthesis Example 2 | 10% (as a solid content) |
| 1,3-butanediol | 10% |
| Glycerin | 10% |
| 2-pyrrolidone | 1% |
| The compound represented by Structural Formula (1) shown above ($R_1$: $CF_3$, Rf: $C_2F_5$, x = 4, y = 4, z = 20) | 1% |
| 2,2,4-trimethyl-1,3-pentanediol | 2% |

A total of 100% was made by addition of ion-exchange water.

Ink Production Example 13

Magenta Ink 4

| | |
|---|---|
| The magenta pigment dispersion solution produced in Preparation Example 3 | 6% (as a solid content) |
| The acrylic-silicone resin emulsion of Synthesis Example 3 | 15% (as a solid content) |
| Triethylene glycol isobutyl ether | 2% |
| Glycerin | 15% |
| The compound represented by Structural Formula (1) shown above ($R_1$: $CF_3$, Rf: $C_2F_5$, x = 4, y = 4, z = 20) | 1% |
| 2-ethyl-1,3-hexanediol | 2% |

A total of 100% was made by addition of ion-exchange water.

Ink Production Example 14

Cyan Ink 4

| | |
|---|---|
| The cyan pigment dispersion solution produced in Preparation Example 4 | 4% (as a solid content) |
| The acrylic-silicone resin emulsion of Synthesis Example 4 | 15% (as a solid content) |
| 3-methyl-1,3-butanediol | 10% |
| Glycerin | 10% |
| The compound represented by Structural Formula (1) shown above ($R_1$: H, Rf: $C_2F_5$, x = 4, y = 4, z = 20) | 0.5% |
| 2-ethyl-1,3-hexanediol | 2% |

A total of 100% was made by addition of ion-exchange water.

Ink Production Example 15

Cyan Ink 5

| | |
|---|---|
| The cyan pigment dispersion solution produced in Preparation Example 5 | 3.5% (as a solid content) |
| The acrylic-silicone resin emulsion of Synthesis Example 2 | 10% (as a solid content) |
| 1,6-hexanediol | 20% |
| Glycerin | 8% |
| The compound represented by Structural Formula (1) shown above ($R_1$: $CF_3$, Rf: $C_2F_5$, x = 4, y = 4, z = 20) | 1.5% |
| FS-300 (produced by E. I. du Pont de Nemours and Company) | 0.3% |
| 2-ethyl-1,3-hexanediol | 2% |

A total of 100% was made by addition of ion-exchange water.

Ink Production Example 16

Magenta Ink 5

| | |
|---|---|
| The magenta pigment dispersion solution produced in Preparation Example 6 | 5% (as a solid content) |
| The acrylic-silicone resin emulsion of Synthesis Example 2 | 10% (as a solid content) |
| Dipropylene glycol | 15% |
| Glycerin | 15% |
| The compound represented by Structural Formula (1) shown above ($R_1$: $CF_3$, Rf: $C_2F_5$, x = 4, y = 4, z = 20) | 1.5% |
| 2-ethyl-1,3-hexanediol | 2% |

A total of 100% was made by addition of ion-exchange water.

Ink Production Example 17

Yellow Ink 4

| | |
|---|---|
| The yellow pigment dispersion solution produced in Preparation Example 7 | 4% (as a solid content) |
| The acrylic-silicone resin emulsion of Synthesis Example 3 | 15% (as a solid content) |
| 2-methyl-2,4-pentanediol | 10% |
| Glycerin | 10% |
| The compound represented by Structural Formula (1) shown above ($R_1$: $CF_3$, Rf: $C_2F_5$, x = 4, y = 4, z = 20) | 1.5% |
| 2,2,4-trimethyl-1,3-pentanediol | 1% |

A total of 100% was made by addition of ion-exchange water.

Ink Production Example 18

Black Ink 4

| | |
|---|---|
| The black pigment dispersion solution produced in Preparation Example 8 | 8% (as a solid content) |
| The acrylic-silicone resin emulsion of Synthesis Example 2 | 12% (as a solid content) |
| 1,6-hexanediol | 20% |
| Glycerin | 8% |
| The compound represented by Structural Formula (1) shown above ($R_1$: H, Rf: $C_2F_5$, x = 4, y = 4, z = 20) | 1.5% |
| 2-ethyl-1,3-hexanediol | 2.5% |

A total of 100% was made by addition of ion-exchange water.

Ink Production Example 19

Cyan Ink 6

| | |
|---|---|
| The cyan pigment dispersion solution produced in Preparation Example 9 | 4% (as a solid content) |
| W-5025 (urethane resin emulsion, produced by Mitsui Takeda Chemicals, Inc.) | 14% (as a solid content) |
| 1,3-butanediol | 20% |
| Glycerin | 8% |
| The compound represented by Structural Formula (1) shown above ($R_1$: $CF_3$, Rf: $C_2F_5$, x = 3, y = 3, z = 20) | 1.5% |
| 2-ethyl-1,3-hexanediol | 2% |

A total of 100% was made by addition of ion-exchange water.

Ink Production Example 20

Magenta Ink 6

| | |
|---|---|
| The magenta pigment dispersion solution produced in Preparation Example 6 | 7% (as a solid content) |
| W-5661 (urethane resin emulsion, produced by Mitsui Takeda Chemicals, Inc.) | 10% (as a solid content) |
| 1,5-pentanediol | 15% |
| Glycerin | 15% |
| The compound represented by Structural Formula (1) shown above ($R_1$: $CF_3$, Rf: $C_2F_5$, x = 3, y = 3, z = 20) | 1.5% |
| 2-ethyl-1,3-hexanediol | 2% |

A total of 100% was made by addition of ion-exchange water.

Ink Production Example 21

Yellow Ink 5

| | |
|---|---|
| The yellow pigment dispersion solution produced in Preparation Example 7 | 6% (as a solid content) |
| The acrylic-silicone resin emulsion of Synthesis Example 3 | 15% (as a solid content) |
| 2-methyl-2,4-pentanediol | 10% |
| Glycerin | 10% |
| The compound represented by Structural Formula (1) shown above ($R_1$: $CF_3$, Rf: $C_2F_5$, x: 3, y = 3, z = 20) | 1.5% |
| 2,2,4-trimethyl-1,3-pentanediol | 3% |

A total of 100% was made by addition of ion-exchange water.

Ink Production Example 22

Black Ink 5

| | |
|---|---|
| The black pigment dispersion solution produced in Preparation Example 1 | 7% (as a solid content) |
| The acrylic-silicone resin emulsion of Synthesis Example 2 | 14% (as a solid content) |
| 1,6-hexanediol | 10% |
| Glycerin | 10% |
| The compound represented by Structural Formula (1) shown above ($R_1$: H, Rf: $C_2F_5$, x = 4, y = 4, z = 20) | 1.5% |
| 2-ethyl-1,3-hexanediol | 2.5% |

A total of 100% was made by addition of ion-exchange water.

Preparation of Comparative Pigment Ink

Production Examples 23 and 24

Ink Production Example 23

Yellow Ink 6

A yellow ink was obtained in a manner similar to Ink Production Example 17, except that the acrylic-silicone resin emulsion of Synthesis Example 3 was not used.

Ink Production Example 24

Black Ink 6

A black ink was obtained in a manner similar to Ink Production Example 18, except that the acrylic-silicone resin emulsion of Synthesis Example 2 was not used.

Preparation of Dye Ink

Comparative Production Examples 5 to 8

The following components were mixed together and sufficiently stirred so as to dissolve, then the mixtures were filtered under pressure, using a membrane filter (FLUOROPORE FILTER, manufactured by Sumitomo Electric Industries, Ltd) having a pore size of 0.45 μm, and a dye ink set was thus prepared.

Dye Ink Composition:

(Dyes)

Comparative Production Example 5: Yellow; C.I. Direct Yellow 86

Comparative Production Example 6: Cyan; C.I. Direct Blue 199

Comparative Production Example 7: Magenta; C.I. Acid Red 285

Comparative Production Example 8: Black; C.I. Direct Black 154

(Ink Formulation)

| | |
|---|---|
| Each of the above-mentioned dyes | 4% |
| Glycerin | 10% |
| Diethylene glycol | 5% |
| Tetramethylurea | 5% |
| F-470 (produced by Dainippon Ink And Chemicals, Incorporated) | 1% |

A total of 100% was made by addition of ion-exchange water.

The following explains the ink compositions, as the inks of Ink Production Examples and Comparative Production Examples of the present invention are shown in Table 4.

The surface tension and viscosity of each ink, and the mass ratio (A)/(B) of each water-dispersible resin (A) to each colorant (B) are shown in Table 4.

The surface tension of each ink was measured using CBVP-Z manufactured by Kyowa Interface Science Co., Ltd. The viscosity of each ink was measured using the R-type viscometer RC-500 manufactured by TOKI SANGYO CO., LTD.

TABLE 4

| Ink Production Example | Ink | Surface tension (mN/m) | Viscosity (mPa·s) | (A)/(B) |
|---|---|---|---|---|
| Ink Production Example 11 | Black ink 3 | 28.7 | 7.14 | 0.5 |
| Ink Production Example 12 | Yellow ink 3 | 27.1 | 8.71 | 2.0 |
| Ink Production Example 13 | Magenta ink 4 | 26.8 | 8.98 | 2.5 |
| Ink Production Example 14 | Cyan ink 4 | 27.6 | 8.64 | 3.75 |
| Ink Production Example 15 | Cyan ink 5 | 25.2 | 8.43 | 2.86 |
| Ink Production Example 16 | Magenta ink 5 | 26.7 | 9.12 | 2.0 |
| Ink Production Example 17 | Yellow ink 4 | 26.8 | 8.69 | 3.75 |
| Ink Production Example 18 | Black ink 4 | 27.9 | 9.07 | 1.5 |
| Ink Production Example 19 | Cyan ink 6 | 26.6 | 7.88 | 3.5 |
| Ink Production Example 20 | Magenta ink 6 | 27.9 | 8.96 | 1.73 |
| Ink Production Example 21 | Yellow ink 5 | 25.6 | 9.11 | 2.5 |
| Ink Production Example 22 | Black ink 5 | 27.4 | 7.69 | 2.0 |
| Comparative Production Example 3 | Comparative pigment cyan ink 1 | 26.1 | 5.24 | 0 |
| Comparative Production Example 4 | Comparative pigment magenta ink 1 | 27.3 | 6.59 | 0 |
| Ink Production Example 23 | Pigment yellow ink 6 | 21.6 | 5.80 | 0 |
| Ink Production Example 24 | Pigment black ink 6 | 26.4 | 6.89 | 0 |
| Comparative Production Example 5 | Comparative dye yellow ink | 23.4 | 3.19 | 0 |
| Comparative Production Example 6 | Comparative dye cyan ink | 23.4 | 3.26 | 0 |
| Comparative Production Example 7 | Comparative dye magenta ink | 23.7 | 3.42 | 0 |
| Comparative Production Example 8 | Comparative dye black ink | 23.2 | 3.28 | 0 |

Next, ink sets of Examples 3 to 9 and Comparative Examples 2 and 3 are shown in Table 5.

TABLE 5

| | Ink set | Black ink | Cyan ink | Magenta ink | Yellow ink |
|---|---|---|---|---|---|
| Example 3 | Ink set 3 | Production Example 11 | Production Example 14 | Production Example 13 | Production Example 12 |
| Example 4 | Ink set 4 | Production Example 18 | Production Example 15 | Production Example 16 | Production Example 17 |
| Example 5 | Ink set 5 | Production Example 11 | Production Example 19 | Production Example 20 | Production Example 21 |
| Example 6 | Ink set 6 | Production Example 22 | Production Example 19 | Production Example 16 | Production Example 12 |
| Example 7 | Ink set 7 | Production Example 11 | Production Example 15 | Production Example 16 | Production Example 17 |
| Example 8 | Ink set 8 | Production Example 18 | Production Example 14 | Production Example 13 | Production Example 12 |
| Example 9 | Ink set 9 | Production Example 18 | Production Example 14 | Production Example 20 | Production Example 21 |
| Comparative Example 3 | Comparative set 3 | Comparative Production Example 8 | Comparative Production Example 6 | Comparative Production Example 7 | Comparative Production Example 5 |

Next, production of original paper (media) will be explained below.

<Production of Original Paper>

| | |
|---|---|
| (Original Paper Production Example 1)-Production of Support 1- LBKP | 80% |
| NBKP | 20% |
| Light calcium carbonate (product name: TP-121, produced by OKUTAMA KOGYO CO., LTD.) | 10% |
| Aluminum sulfate | 1.0% |
| Amphoteric starch (product name: CATO 3210, produced by Nippon NSC Ltd.) | 1.0% |
| Neutral rosin sizing agent (product name: NEUSIZE M-10, produced by Harima Chemicals, Inc.) | 0.3% |
| Yield improver (product name: NR-11LS, produced by HYMO Co., Ltd.) | 0.02% |

A 0.3% slurry containing the components shown above was made into paper using a fourdrinier machine, the paper was subjected to machine calendering, and a support 1 having a basis weight of 79 g/m$^2$ was thus produced. Additionally, in a size pressing process in the papermaking step, a starch oxide aqueous solution was applied onto the paper at a rate of 1.0 g/m$^2$ as a solid content per side.

Paper Example 1

A coating solution having a solid content concentration of 60% was prepared by adding the following compounds and water to the support 1 produced in Original Paper Production Example 1: 70 parts of kaolin (1.6 in refractive index, ULTRAWHITE 90 (produced by Engelhard Corporation)) as a pigment, in which particles that are 2 μm or less in diameter occupy 97% of all particles; 30 parts of heavy calcium carbonate (1.6 in refractive index, CALSHITEC BRILLIANT-15 (produced by Shiraishi Kogyo Kaisha, Ltd.)) having an average particle diameter of 1.1 μm; 8 parts of styrene-butadiene copolymer emulsion as an adhesive, having a glass transition temperature (Tg) of −5° C.; 1 part of phosphoric acid-esterified starch; and 0.5 parts of calcium stearate as an auxiliary agent.

This coating solution was applied onto both surfaces of the original paper using a blade coater such that the coating layer thickness was 1 μm per side, and dried with hot air, then the original paper with this coating solution was subjected to a supercalendering process, and "recording paper 1" of the present invention was thus obtained.

Printing was carried out on sheets of this recording paper 1 as a recording medium at an image resolution of 600 dpi, with the ink compositions and the ink sets shown in Tables 1 and 2, using a 300 dpi drop on-demand experimental printer having nozzles with a nozzle resolution of 384. The amount of ink attached onto the recording paper 1 was controlled, as the maximum droplet size was set at 18 μl and the total amount of a secondary color was limited to 140%. When solid images and letters/characters were printed on a sheet of the recording paper 1, the total amount of ink attached thereto was controlled so as not to exceed 15 g/m$^2$ per area of 300 dots×300 dots. The quality and reliability of the images obtained were evaluated. The results are shown in Table 3. Those evaluated as D are not suitable as ink-jet images.

Paper Example 2

Ink-jet recording was carried out in a manner similar to Paper Example 1, except that the coating layer thickness was changed to 10 μm per side and "recording paper 2" was thus obtained.

Paper Example 3

Ink-jet recording was carried out in a manner similar to Paper Example 2, except that the inorganic pigment contained in the coating solution was changed to 100 parts (as a solid content) of TA-100 (anatase-type titanium oxide, 2.5 in refractive index, produced by Fuji Titanium Industry Co., Ltd.) and "recording paper 3" was thus obtained.

Paper Example 4

Inkjet recording was carried out in a manner similar to Paper Example 1, except that the inorganic pigment contained in the coating solution was changed to 100 parts of TP-221 (light calcium carbonate, 1.6 (1.59) in refractive index, produced by OKUTAMA KOGYO CO., LTD.), the coating layer thickness was changed to 5 µm per side and "recording paper 4" was thus obtained.

Paper Example 5

Ink-jet recording was carried out in a manner similar to Paper Example 1, except that the coated paper SPACE DX for gravure printing (which contains kaolin (1.6 in refractive index) and calcium carbonate (1.6 in refractive index); produced by Nippon Paper Group, Inc.) was used (as "recording paper 5") for the recording medium.

Paper Example 6

Ink-jet recording was carried out in a manner similar to Paper Example 1, except that the coated paper POD GLOSS for electronic photographs (which contains kaolin (1.6 in refractive index) and calcium carbonate (1.6 in refractive index); produced by Oji paper Co., Ltd.) was used (as "recording paper 6") for the recording medium.

Paper Example 7

Ink-jet recording was carried out in a manner similar to Paper Example 6, except that the surface of the coated paper POD GLOSS for electronic photographs (which contains kaolin (1.6 in refractive index) and calcium carbonate (1.6 in refractive index); produced by Oji paper Co., Ltd.) was polished 20 times with wrapping paper such that the coating layer thickness was 5.1 µm per side, and this paper was used (as "recording paper 7") for the recording medium.

As to the media of Paper Examples 1 to 7, as a result of binarizing the observation images with the use of FE-SEM S-4200 manufactured by Hitachi, Ltd., it was confirmed that pores were 1 µm or less in diameter, the pores occupied 40% or less of the media surface in area, which was measured based upon the areas of pores that occupied the images, and thus all these Paper Examples satisfied the requirements concerning the pores in the barrier layers.

The following explains the evaluation items and evaluation methods concerning Examples and Comparative Examples shown in Table 5.

(Evaluation Item and Measuring Method Therefor)

(1) Image Quality

1. Ink Strike-Through

Portions of sheets of paper on the opposite side to green solid image portions of Examples and Comparative Examples were measured for image density, and the values obtained by subtracting the densities of background portions from the respective image densities were defined as ink strike-through densities. The images were evaluated in accordance with the following evaluation criteria, utilizing these ink strike-through densities and judgment based upon visual observation.

[Evaluation Criteria]
A: the ink strike-through density was 0.1 or less, and uniform printing was yielded without even causing minor ink strike-through B: the ink strike-through density was 0.15 or less, and uniform printing was yielded without even causing minor ink strike-through C: the ink strike-through density was 0.15 or less, but occurrence of minor ink strike-through was confirmed D: occurrence of serious ink strike-through was confirmed 2. Beading Green solid image portions of Examples and Comparative Examples were each visually observed for the extent of beading and evaluated in accordance with the following evaluation criteria.

[Evaluation Criteria]
5: uniform printing was yielded without causing beading
4: occurrence of slight beading was confirmed, but it was not at all noticeable
3: occurrence of beading was confirmed, but it does not impair the image quality
2: occurrence of beading was clearly confirmed
1: occurrence of serious beading was confirmed 3. Evaluation of Image Density Magenta solid image portions of Examples and Comparative Examples were measured for optical density, using X-RITE 932, and evaluated in accordance with the following evaluation criteria.

[Evaluation Criteria]
A: 1.6 or greater in magenta image density
B: 1.3 or greater in magenta image density
C, 1.0 or greater in magenta image density
D: less than 1.0 in magenta image density 4. Evaluation of Glossiness Image portions of Examples and Comparative Examples were visually observed for the extent of glossiness and evaluated in accordance with the following evaluation criteria.

[Evaluation Criteria]
A: high glossiness was confirmed
B: glossiness was confirmed
C: glossiness was slightly confirmed
D: glossiness was not confirmed (2) Image Reliability <Evaluation of Abrasion Resistance>

Images of black, cyan, magenta, yellow, red, green and blue in the shape of squares each having a size of 3 cm×3 cm were formed and used for evaluation. Twenty four hours after the squares had been printed onto sheets of paper, a white cotton cloth (JISL 0803, Cotton No. 3) stuck onto a friction member with a two-sided adhesive tape (#4016, t=1.6; produced by Sumitomo 3M Limited) was rubbed back and forth five times against each square using a clock meter (Model GM-1), then the density of the coloring material attached to the cotton cloth was measured using a spectrophotometric colorimetry densitometer (Model-938, manufactured by X-Rite, Inc.).

[Evaluation Criteria]
A: less than 0.05 in the density of the coloring material attached to the cotton cloth
B: 0.05 or greater, and less than 0.08 in the density of the coloring material attached to the cotton cloth
C: 0.08 or greater, and less than 0.1 in the density of the coloring material attached to the cotton cloth
D: 0.1 or greater in the density of the coloring material attached to the cotton cloth The evaluation results are shown in Table 6.

TABLE 6

| | Coloring material | Paper | Ink strike-through | Beading | Density | Glossiness | Abrasion resistance |
|---|---|---|---|---|---|---|---|
| Example 3 | Pigment | Paper 1 | A | 4.5 (A) | B | B | B |
| Example 4 | Pigment | Paper 3 | A | 4.5 (A) | B | B | A |
| Example 5 | Pigment | Paper 5 | A | 4.0 (B) | B | B | B |
| Example 6 | Pigment | Paper 6 | A | 4.0 (B) | B | B | B |
| Example 7 | Pigment | Paper 7 | A | 4.5 (A) | B | B | B |
| Example 8 | Pigment | Paper 2 | A | 4.0 (B) | B | B | B |
| Example 9 | Pigment | Paper 2 | A | 4.0 (B) | B | B | B |
| Comparative Example 3 | Dye | Paper 7 | C | 1.0 (D) | D | C | D |

Note:
beading ranked as 4.5 is at the level intermediate between rank 5 and rank 4 according to the relevant evaluation criteria

The invention claimed is:

1. An ink-jet recording ink comprising:
   water,
   a water-soluble organic solvent,
   a pigment (P1) as a colorant (B), and
   at least one fluorochemical surfactant selected from compounds represented by Structural Formula (1) below, Structural Formula (1)

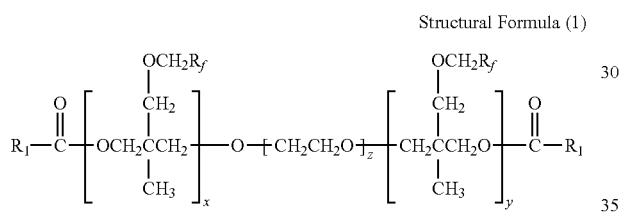

where $R_1$ denotes any one of a hydrogen atom, an alkyl group and a fluorine-containing group, Rf denotes a fluorine-containing group, and each of x, y and z denotes an integer of 1 or greater.

2. The ink-jet recording ink according to claim 1, further comprising a water-dispersible resin (A), wherein the water-soluble organic solvent is at least one selected from the group consisting of glycerin, trimethylolpropane, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, 1,6-hexanediol, 2-methyl-2,4-hexanediol, 2-pyrrolidone, N-methyl-2-pyrrolidone, N-hydroxyethyl-2-pyrrolidone, tetramethylurea and urea.

3. The ink-jet recording ink according to claim 2, wherein the water-dispersible resin (A) contains at least one of an anionic self-emulsifiable ether-based polyurethane resin emulsion and an acrylic-silicone resin emulsion.

4. An ink cartridge comprising:
   a container to house an ink-jet recording ink which comprises water, a water-soluble organic solvent, a pigment (P1) as a colorant (B), and at least one fluorochemical surfactant selected from compounds represented by Structural Formula (1) below, Structural Formula (1)

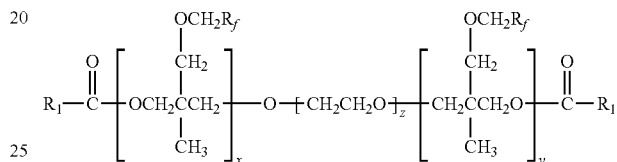

where $R_1$ denotes any one of a hydrogen atom, an alkyl group and a fluorine-containing group, Rf denotes a fluorine-containing group, and each of x, y and z denotes an integer of 1 or greater.

5. An ink-jet recording method comprising:
   performing recording with the use of a combination of an ink jet recording ink and a recording medium,
   wherein the ink-jet recording ink comprises water, a water-soluble organic solvent, a pigment (P1) as a colorant (B), and at least one fluorochemical surfactant selected from compounds represented by Structural Formula (1) below,
   wherein the recording medium is an ink-jet recording medium for pigment ink, which includes a support containing cellulose pulp, and one or more pigment penetration preventing layers on one or both surfaces of the support, with the one or more pigment penetration preventing layers containing 30% by mass or more of an inorganic pigment (P2) that is different from an alumina hydrate and that has a refractive index of 1.5 or greater, and containing 10% by mass or less of a pigment (P2) that has a refractive index of less than 1.5, and
   wherein the amount of the ink-jet recording ink attached onto the recording medium is 15 g/m² or less, Structural Formula (1)

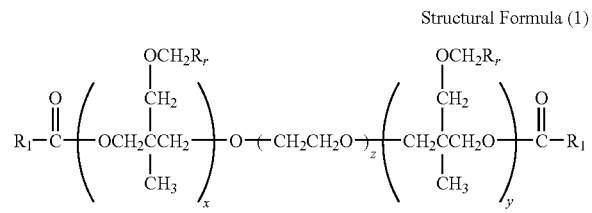

where $R_1$ denotes any one of a hydrogen atom, an alkyl group and a fluorine-containing group, Rf denotes a fluorine-containing group, and each of x, y and z denotes an integer of 1 or greater.

* * * * *